US007035201B2

(12) United States Patent
Fu et al.

(10) Patent No.: US 7,035,201 B2
(45) Date of Patent: Apr. 25, 2006

(54) PROGRAMMABLE TRANSCEIVER STRUCTURE OF MULTI-RATE OFDM-CDMA FOR WIRELESS MULTIMEDIA COMMUNICATIONS

(75) Inventors: Po-Wei Fu, Taipei (TW); Kwang-Cheng Chen, Palo Alto, CA (US)

(73) Assignee: Mediatek Inc., Hsinchu (TW)

( * ) Notice: Subject to any disclaimer, the term of this patent is extended or adjusted under 35 U.S.C. 154(b) by 852 days.

(21) Appl. No.: 09/950,859

(22) Filed: Sep. 12, 2001

(65) Prior Publication Data
US 2003/0026200 A1 Feb. 6, 2003

Related U.S. Application Data

(60) Provisional application No. 60/285,412, filed on Apr. 20, 2001.

(51) Int. Cl.
*H04J 11/00* (2006.01)
(52) U.S. Cl. .................. 370/208; 370/320; 370/335
(58) Field of Classification Search ............. 370/208, 370/203, 335, 320, 342, 210, 441, 148, 260, 370/144; 375/148, 260, 144
See application file for complete search history.

(56) References Cited

U.S. PATENT DOCUMENTS

| | | | | |
|---|---|---|---|---|
| 5,471,464 A | * | 11/1995 | Ikeda ........................ 370/203 |
| 6,137,788 A | * | 10/2000 | Sawahashi et al. ......... 370/342 |
| 6,282,185 B1 | * | 8/2001 | Hakkinen et al. .......... 370/342 |
| 6,373,861 B1 | * | 4/2002 | Lee ............................ 370/503 |
| 6,654,408 B1 | * | 11/2003 | Kadous et al. ............. 375/148 |
| 6,882,619 B1 | * | 4/2005 | Gerakoulis .................. 370/209 |
| 6,885,692 B1 | * | 4/2005 | Misra et al. ................ 375/140 |
| 2001/0028637 A1 | * | 10/2001 | Abeta et al. ................ 370/335 |
| 2002/0159422 A1 | * | 10/2002 | Li et al. ..................... 370/342 |
| 2002/0159425 A1 | * | 10/2002 | Uesugi et al. .............. 370/342 |
| 2002/0181549 A1 | * | 12/2002 | Linnartz et al. ............ 375/142 |
| 2003/0002433 A1 | * | 1/2003 | Wu et al. ................... 370/203 |
| 2003/0147655 A1 | * | 8/2003 | Shattil ........................ 398/182 |
| 2005/0025042 A1 | * | 2/2005 | Hadad ........................ 370/208 |

OTHER PUBLICATIONS

Kwang-Cheng Chen and Shan-Tsung Wu, "A Programmable Architectecture for OFDM-CDMA", IEEE Communication Magazine.*
Homyoun Nikookar and Ramjee Prasad, Multicarrier Transmission with Nonuniform Carrier in a Multipath Channel, IEEE Communication Magazine.*

(Continued)

*Primary Examiner*—Wellington Chin
*Assistant Examiner*—Binh Q Nguyen
(74) *Attorney, Agent, or Firm*—Thomas, Kayden, Horstemeyer & Risley

(57) ABSTRACT

Two multi-rate transmission schemes, multi-code (MC) and variable-spreading-length (VSL) code, for realizing multimedia communications on three types of OFDM-CDMA systems are proposed. These systems can be integrated into a programmable structure such that the operation can be controlled and adjusted by system parameters and thus the transceiver can be used in different systems without changing the fundamental hardware and software architecture, which serves the trend of software-radio for future application. A transceiver architecture of multi-rate OFDM-CDMA systems is illustrated and showed its programmability such that the general system can operate under different scenarios with a common hardware structure and reconfigure by software implementation.

26 Claims, 16 Drawing Sheets

OTHER PUBLICATIONS

Shinsuke Hara, Ramjee Prasad, "Overview of Multicarrier CDMA", IEEE Communication Magazine.*
"A Family of Suboptimum Detectors for Coherent Multiuser Communications" Xie et al., 1990, pp. 683-690.
"Multitone Spread Spectrum Multiple Access Communications System in a Multipath Rician Fading Channel" Vandendorpe, 1995, pp. 327-337.
"Multi-Rate Schemes in DS/CDMA Systems" Ottosson et al., 1995, pp. 1006-1010.
"Performance of Orthogonal Multicarrier CDMA in a Mutipath Fading Channel" Sourour et al., 1996, pp. 356-367.
"Overview of Multicarrier CDMA" Hara et al., 1997, pp. 126-133.
"A Programmable Architecture for OFDM-CDMA" Chen et al., 1999, pp. 76-82.
"Space-Time Multiuser Detection in Multipath CDMA Channels" Wang et al., 1999, pp. 2356-2374.
"Orthogonal Frequency CDMA for Broadband Communications" Wu et al., 1999, pp. 2890-2894.

* cited by examiner

PROGRAMMABLE TRANSCEIVER STRUCTURE OF MULTI-RATE OFDM-CDMA FOR WIRELESS MULTIMEDIA COMMUNICATIONS

This application claims priority from U.S. Provisional Application Ser. No. 60/285,412, filed Apr. 20, 2001, entitled "A Programmable Transceiver Structure Of Multi-Rate OFDM-CDMA For Wireless Multimedia Communications", which is incorporated herein by reference in its entirety.

FIELD OF THE INVENTION

The present invention relates generally to multiple access and multiplexing in wireless multimedia communications, and particularly to a programmable transceiver structure of multi-rate OFDM-CDMA for wireless multimedia communications

BACKGROUND OF THE INVENTION

In the diverse multisystem and multistandard wireless communication environment, software-defined radio is an extremely promising technology. Wide-band code-division multiple access (CDMA) has been promoted for International Mobile Telecommunications year 2000 (IMT-2000) third-generation wireless systems (3G) primarily because of its greater capacity compared with time-division multiple access (TDMA) and frequency-division multiple access (FDMA) systems for cellular communication. However, the performance of wideband CDMA suffers from multiple access interference (MAI) and inter-symbol interference (ISI) due to severe multipath fading. To combat the hostile wireless channel and meanwhile better utilize the spectrum and radio resources with acceptable bit error rates (BER), CDMA combining orthogonal frequency-division multiplexing (OFDM) has been proposed for future wireless multimedia communications.

Many experts believe that multimedia communication will be in the main stream of future communications systems, but it generates problems in effective transmission. As code-division multiple-access (CDMA) is being utilized for the third generation and other possible future communication systems due to its advantages over other multiple access schemes, there is a need to actuate multimedia services based on CDMA. On the other hand, orthogonal-frequency-division-multiplexing (OFDM) has been used in high-speed digital communications, which can be efficiently implemented by the Fast-Fourier-Transform (FFT) digital technique (K. Fazel, S. Kaiser and M. Schnell, "A flexible and high-performance cellular mobile communication system based on orthogonal multi-carrier SSMA," *IEEE Wireless Personal Communications*, vol. 2, No. 1, pp. 121–144, 1995), and is known as an approach to the problems inherent in highly hostile mobile channels in high-speed transmissions. Combining CDMA and OFDM results in a finer partition of radio resources, which makes the resource allocation more effective. Therefore, OFDM-CDMA for multimedia applications is an attractive candidate for Fourth Generation wireless communication systems (4G). The realization of multi-rate transmission and implementation by a flexible software-defined architecture is of significant interest. Generally, multiple access schemes based on the combination of CDMA and OFDM can be divided into three types, namely MC-CDMA, MC-DS-CDMA, and MT-CDMA (Shinsuke Hara, Rarnjee Prasad, "Overview of multicarrier CDMA," *IEEE Communication Magazine*, pp. 126–133, December 1997). However, these prior art designs are only suitable for use in single rate data streams, and are not suitable for use in multi-rate applications.

SUMMARY OF THE INVENTION

To effectively realize multi-data-rate transmission, two transmission methods, based on Multi-Code (MC) and Variable-Spreading-Length (VSL) code strategies, for the three OFDM-CDMA types are disclosed. In addition, a transceiver architecture accommodating these six multi-rate OFDM-CDMA scenarios is disclosed having programmability such that system operation can be controlled and reconfigured solely by adjusting software parameters and the accommodation to different systems is achieved utilizing only one fundamental hardware and software architecture. Further, although the invention focuses on multi-rate applications, the present invention's architecture is backward compatible to accommodate single-rate OFDM-CDMA systems, pure CDMA systems, and pure OFDM systems. Since the occupied bandwidth of each OFDM-CDMA system is kept fixed for users of any data rate in both MC access and VSL access modes, multi-rate applications do not increase requirements such as the A/D sampling rate and the low-pass filter bandwidth on hardware devices.

BRIEF DESCRIPTION OF THE DRAWINGS

The present invention is disclosed in the detailed description given hereinbelow and the accompanying drawings, which are presented as means of illustration only and thus are not limitative of the present invention, in which.

DETAILED DESCRIPTION OF THE INVENTION

Assuming that there is a basic data rate supported in the systems to be described and the data rate of each user is an integer multiple m of that basic data rate. The detailed structures of six multi-rate (MR)-OFDM-CDMA scenarios will be described following.

1. Multi-rate MC-CDMA systems

1.1 MC-CDMA System

An MC-CDMA transmitter spreads the original data stream over different subcarriers using a given spreading code in the frequency domain. The original stream with each data having a predetermined duration $T_s$ is series-to-parallel (S/P) converted into groups of P data sub-streams with duration $T=PT_s$. A sequence of length F constitutes the spreading codes for user k. Then F identical branches copied from the data sub-streams for each group are multiplied by the corresponding bit of the spreading codes. Finally, each branch modulates a sub carrier for transmission. The separation between adjacent sub-carriers equals 1/T to satisfy the condition for orthogonality with minimum frequency separation.

Figure 1:
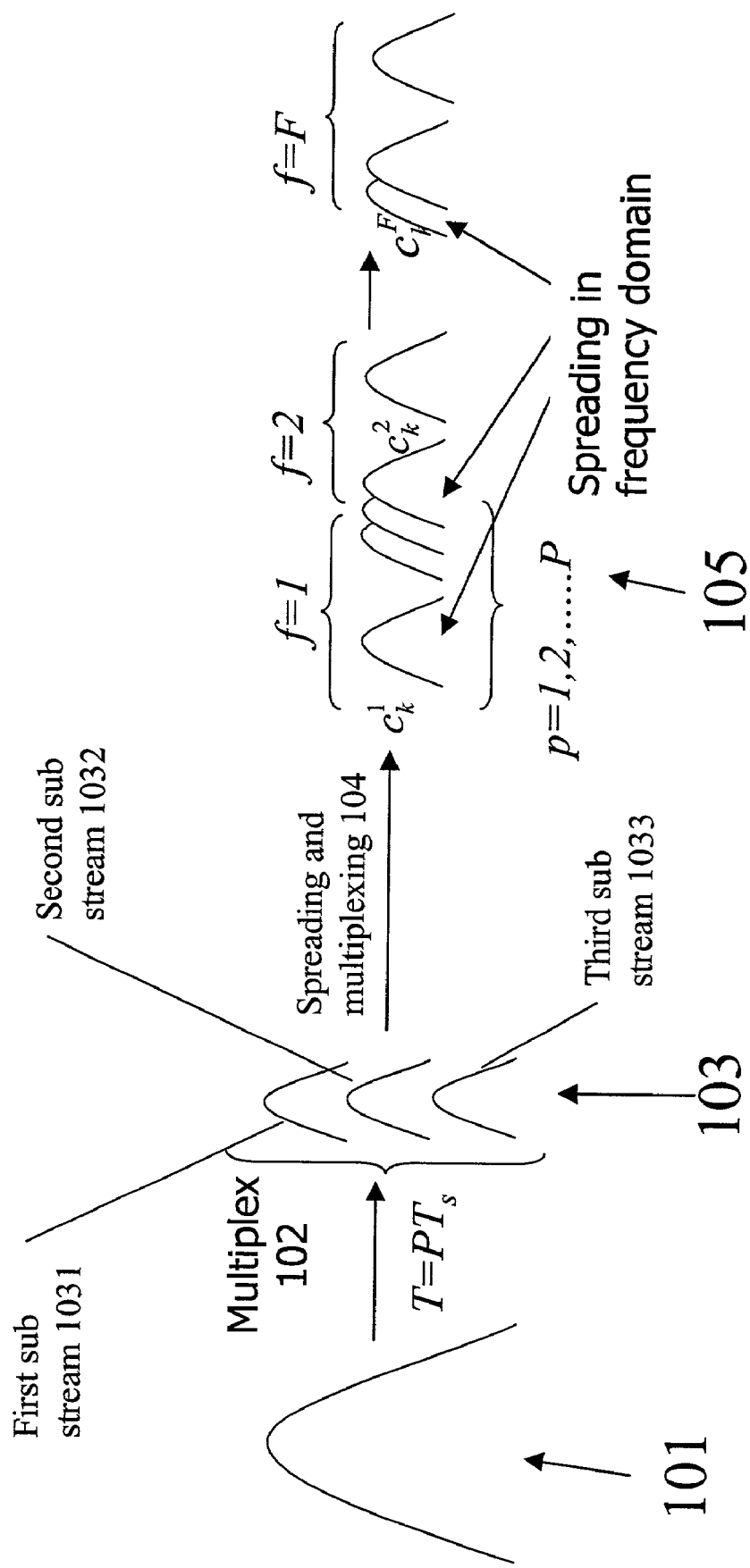
FIG. 1 is a schematic view showing the prior art frequency band change in different stages of MC-CDMA.

FIG. 1 is a schematic view showing the frequency band change in different stages of MC-CDMA. At first, an input data stream with a wider band width (101) is multiplexed by a multiplexer (102) into a plurality of sub-streams (103) with each sub-stream (103) having a narrower bandwidth. In this example three sub-streams (1031), (1032), and (1033) are illustrated. The total bandwidth covered by all the sub-streams (103) is equal to the original bandwidth of the input data stream (101). Then all the sub-streams (103) are spread in the frequency domain and multiplexed for transmission (104). Shown is the first sub-stream (1031) in this step being spread and multiplexed into three branches $C_k^1$, $C_k^2$, $C_k^3$ which are distributed in the group $f=1$, $f=2$, and $f=F$. The second and third sub-streams (1032) and (1033) are similarly spread and multiplexed.

Figure 2:
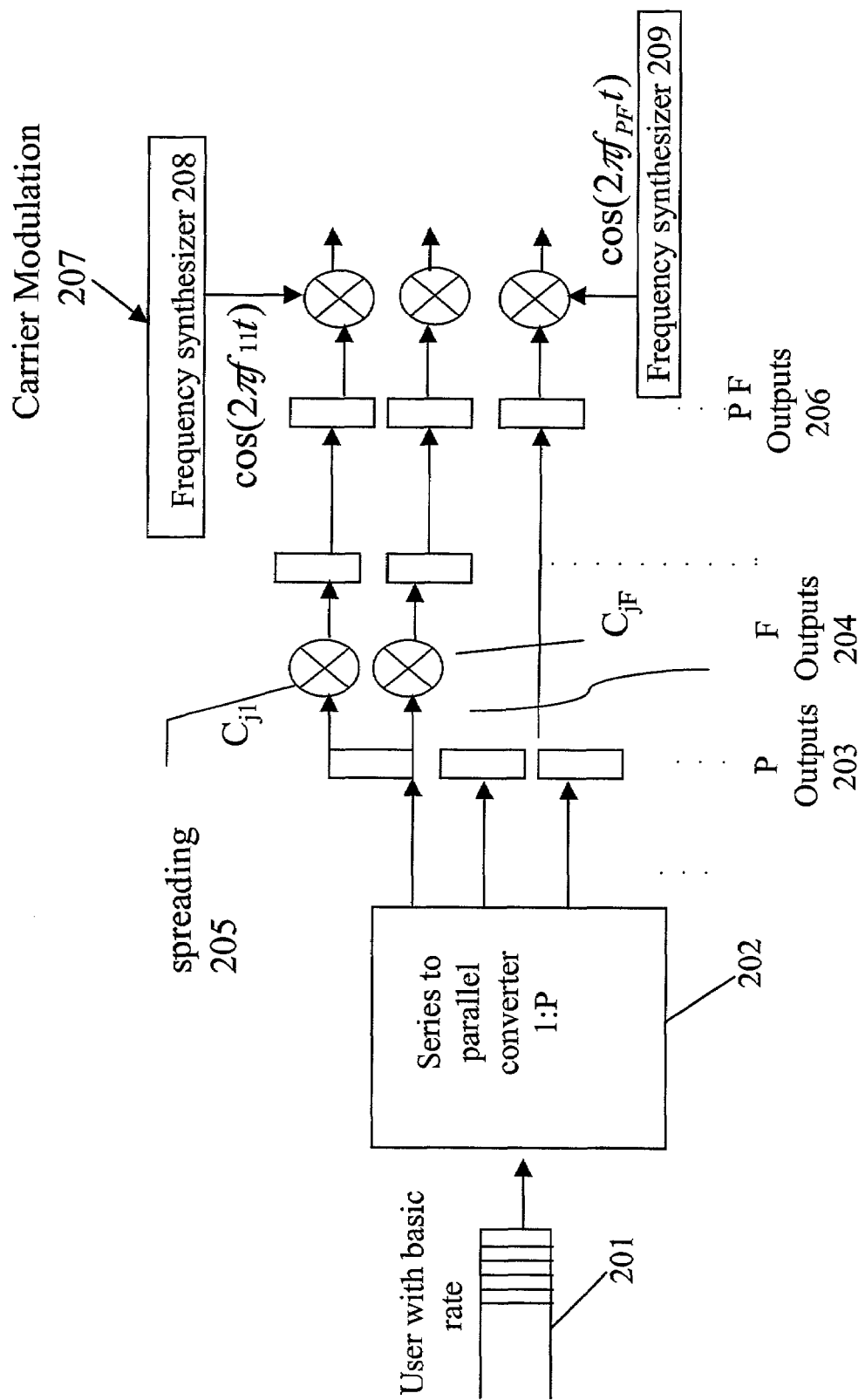
FIG. 2 illustrates a prior art MC-CDMA transmitter with a binary phase shift keying (BPSK) modulation scheme.

Referring now to FIG. 2, an MC-CDMA transmitter of a single user with a binary phase shift keying (BPSK) modulation scheme is illustrated. The symbol duration of an input data stream (201) is $T_s$. Then the input data stream (201) is series-to-parallel converted by SPC 202 into P outputs (203) with each output datum having time duration of $T=PT_s$. Then each datum is copied into F branches at (204), where F is the constant spreading factor of the spread spectrum operation in the system. Each datum is then spread by the spreading codes of length F at (205). Thus, there are P×F parallel outputs for the outputs (206). These PF parallel outputs are transmitted by PF orthogonal carriers 207 respectively, where carrier frequencies are synthesized from frequency synthesizers 208, 209, and inverse discrete Fourier transform (IDFT) can perform this modulation on orthogonal carriers equivalently. Transmitted BPSK signals of a system in base band is described by the following equation:

$$x(t) = \sum_{p=1}^{P} Ab_p \sum_{f=1}^{F} c_f e^{j2\pi f_{pf} t}, 0 \le t \le PT_s, \quad (1)$$

where, $b_p$ is the pth symbol, and A is the transmitted amplitude. $\Delta f \equiv f_{p,f+1} - f_{p,f} = 1/PT_s$, denotes the $f$th bit of the spreading codes.

1.2 Multi-rate MC-CDMA

In the present invention, for multi-rate MC-CDMA, two methods are disclosed, one is MC-accessed MC-CDMA, and the other is VSL-accessed MC-CDMA. In the MC-accessed MC-CDMA, a data stream of a user with a rate being several times a basic rate is first multiplexed into different streams with a basic rate and then each is treated as an individual (effective) user with individual spreading codes. In the VSL-accessed MC-CDMA, the data stream from a user is directly serial-to-parallel (S/P) converted into sub-streams, where the assigned number of sub-carriers is various corresponding to the data rate. The details of these two methods will be described hereinafter.

1.2.1 MC-accessed MC-CDMA

Figure 3:
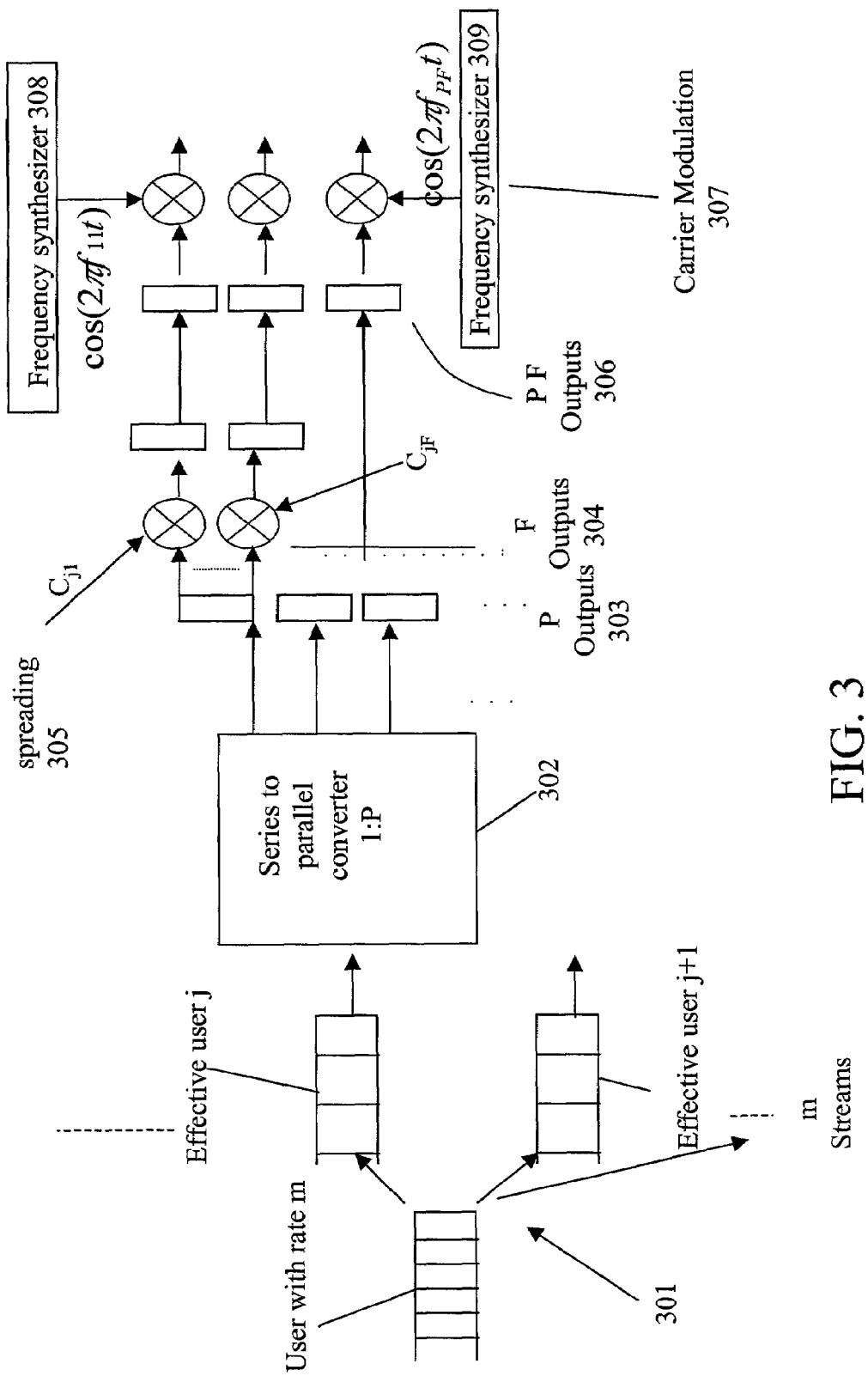
FIG. 3 illustrates an MC-accessed MC-CDMA transmitter with a binary phase shift keying (BPSK) modulation scheme.

Referring now to FIG. 3, the data stream of a user with rate m is first multiplexed into m different streams with basic rate (301) and then each is treated as an individual (effective) user with individual spreading codes. For each stream, it is then S/P converted to P sub-streams (303) by a serial to parallel converter 302, where the number of carriers used in the system depends on P. The spreading stage in MC-CDMA systems in concept is an operation in the frequency domain. That is, for frequency-domain spreading, symbols on each sub-stream is copied into F branches (304), where F is the constant spreading factor of the spread spectrum operation in the system and the symbol at each branch is multiplied by the corresponding bit of the spreading codes (305). Thus, there are PF parallel outputs (306) of each effective user after the frequency domain spreading. After combining all the corresponding parallel outputs from other users, they are transmitted by PF orthogonal carriers respectively (307), where modulation frequencies are synthesized from frequency synthesizers 308, 309 and inverse discrete Fourier transform (IDFT) can perform this modulation on orthogonal carriers equivalently. Let $K_m$ denote the number of users with rate m, and there are totally $$K = \sum_{m=1}^{M} mK_m$$

effective users. Labeling the effective users as user 1, 2, ..., and the transmitted BPSK signal of a system containing M data rates in baseband is $$x(t) = \sum_{k=1}^{K} \sum_{p=1}^{P} A_k b_{kp} \sum_{f=1}^{F} c_{kf} e^{j2\pi f_{pf} t}, 0 \le t \le PT_s, \quad (2)$$

where $$K = \sum_{m=1}^{M} mK_m \, b_{kp}$$

is the pth symbol of the kth effective user, and $A_k$ is the transmitted amplitude of the kth effective user. $\Delta f \equiv f_{p,f+1} - f_{p,f} = 1/PT_s$, where $T_s$ is the symbol duration of the basic-rate data stream before S/P conversion. $c_{kf} \in \{\pm 1\}$ denotes the fth bit of the spreading codes used by the kth effective user.

1.2.2 VSL-accessed MC-CDMA

Figure 4:
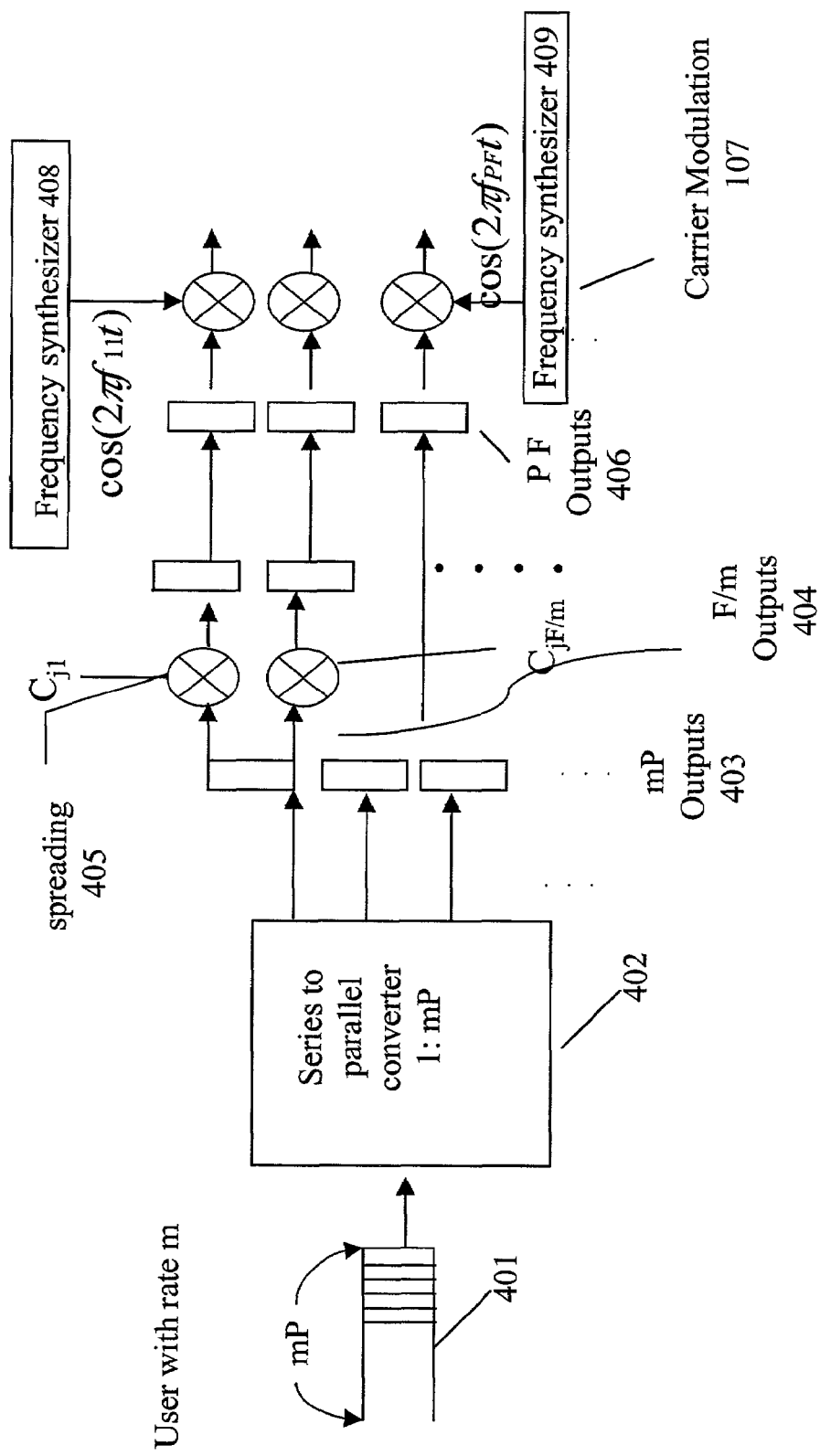
FIG. 4 illustrates a VSL-accessed MC-CDMA transmitter with a binary phase shift keying (BPSK) modulation scheme.

With reference to FIG. 4, a data stream from a user with rate m (401) is directly S/P converted into Pm sub-streams (403) through a serial to parallel converter (402). For frequency domain spreading, symbols on each sub-stream are copied into F/m branches (404) and then the symbols on each branch are multiplied by the corresponding bit of spreading codes (405). That is, the spreading factor of a user with rate m is F/m. Note that F/m should be chosen as an integer in our system design. Regardless of the data rate, there are in total PF parallel signal outputs (406) for a user after such frequency domain spreading. Combining all the corresponding parallel signals from other users, they are transmitted by PF orthogonal carriers respectively (407), where modulation frequencies are synthesized from frequency synthesizers 408, 409 and inverse discrete Fourier transform (IDFT) can perform such modulation equivalently. The bandwidth of each sub-carrier and the overall occupied bandwidth are the same as in MC access. The transmitted signal in a VSL system containing M data rates is $$x(t) = \sum_{m=1}^{M} \sum_{k=1}^{K_m} \sum_{p=1}^{mP} A_{mk} b_{mkp} \sum_{f}^{F/m} c_{mkf} e^{j2\pi f_{pf} t}, \, 0 \le t \le PT_s, \quad (3)$$

where $K_m$ denotes the number of users with rate m, $b_{mkp}$ is the pth symbol of the kth user with rate m, $A_{mk}$ is the transmitted amplitude, and $\Delta f = 1/PT_s \cdot c_{mkf} \in \{\pm 1\}$ denotes the fth bit of the spreading codes assigned for the kth user with rate m.

2. Multi-rate MC-DS-CDMA

2.1 MC-DS-CDMA

The MC-DS-CDMA transmitter spreads the S/P converted data streams using given spreading codes in the time domain so that the subcarriers are orthogonal with a minimum frequency separation. The original data stream with symbol duration $T_s$ is S/P converted to P groups of data streams with symbol duration $T = PT_s$. Then each data stream is divided into L identical branches and then being spread by the same Spreading codes. Finally, each branch modulates a subcarrier for transmission. The separation between adjacent carriers satisfy the condition for orthogonality with minimum frequency separation.

Figure 5:
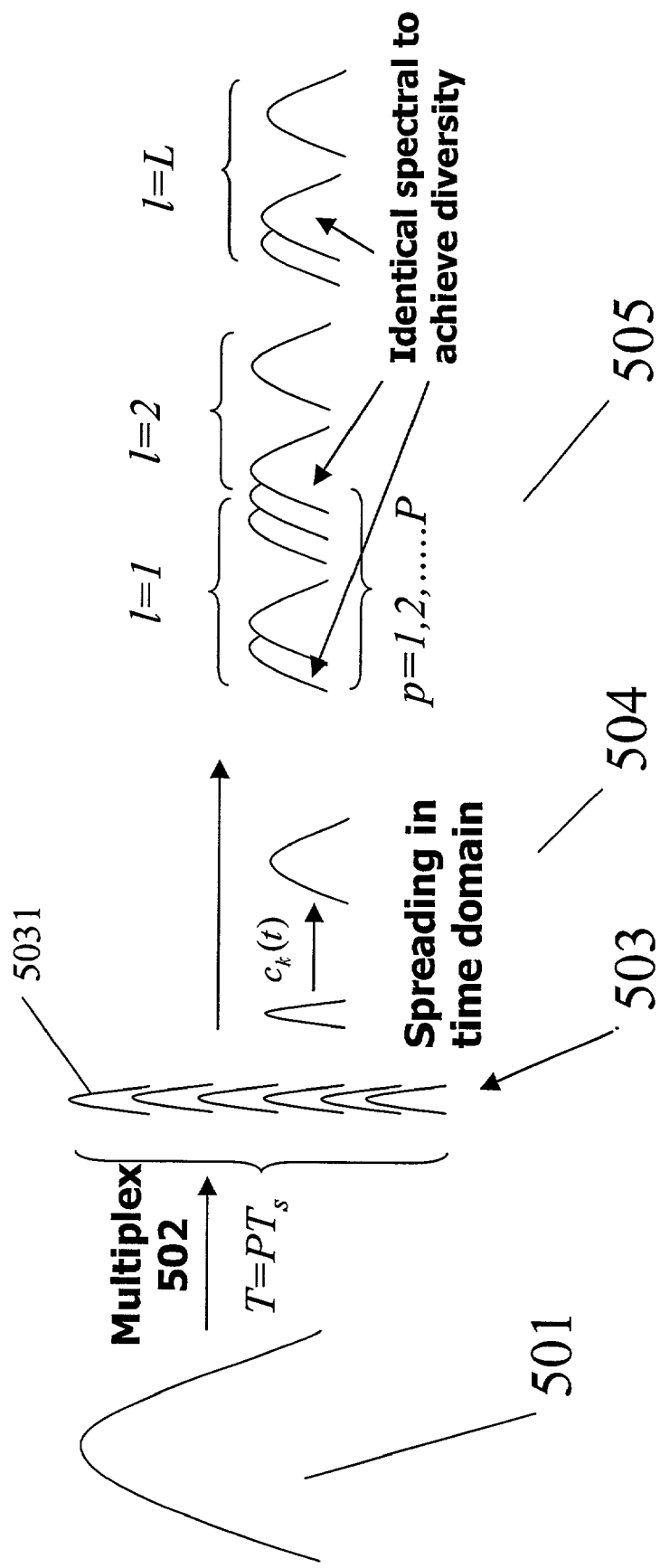
FIG. 5 is a schematic view showing the prior art frequency band change in different stages of MC-CDMA.

FIG. 5 is a schematic view showing the frequency band change in different stages of MC-DS-CDMA. At first, an input data stream with a wider band width (501) is multiplexed (502) into a plurality of sub-streams (503) with each sub-stream (503) having a narrower bandwidth. The total bandwidth covered by all the sub-streams (503) is equal to the original bandwidth of the input data stream (501). Then all the sub-streams (503) are spread in the "time domain" (instead of the frequency domain as in the case of MC-CDMA) and multiplexed for transmission at (504). The first sub-stream (5031), for example, in this step is spread and copied into three branches which are distributed in the group l=1, l=2, and l=L to increase diversity. Other sub-streams are multiplexed and spread similarly.

Figure 6:
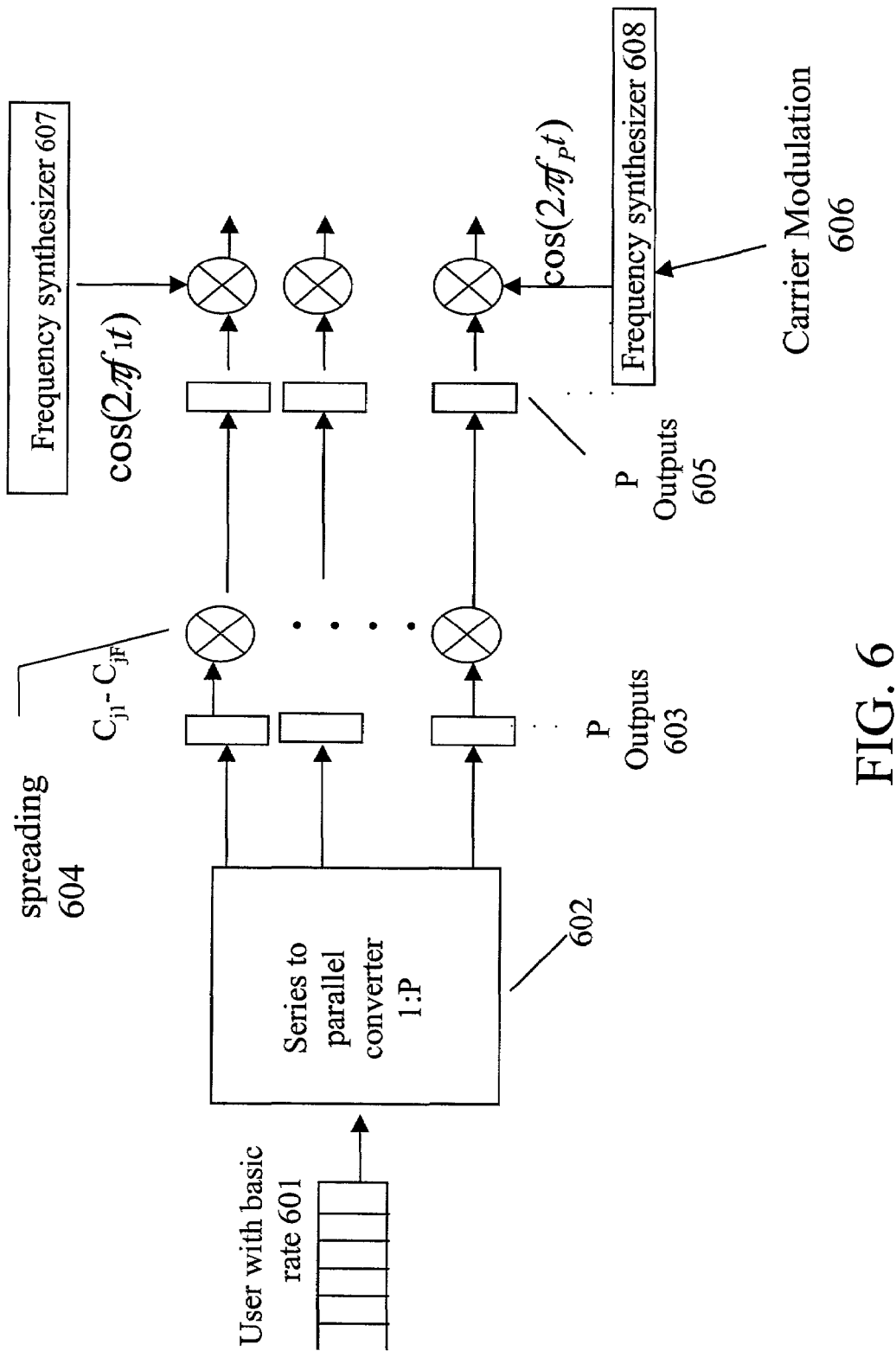
FIG. 6 illustrates a prior art MC-DS-CDMA transmitter with a binary phase shift keying (BPSK) modulation scheme.

Referring now to FIG. 6, an MC-DS-CDMA transmitter of a single user with a binary phase shift keying (BPSK) modulation scheme is illustrated. The symbol duration of the input data stream (601) is $T_s$. At first, the input stream is S/P converted into P parallel sub-streams (603) utilizing a serial to parallel converter 602. At the spectrum-spreading stage, the sub-streams are spread by the same spreading codes with factor F via cyclically multiplying the codes (604) (time-domain spreading as in conventional Direct-Sequence-Spread-Spectrum). After spreading, the number of sub-streams is still P at (605), however, they now will be transmitted by different carriers at (606). For multiuser transmission, combining all the corresponding parallel spread signals from other users, they are transmitted by the orthogonal carriers respectively at (606), where modulation frequencies are synthesized from frequency synthesizers 607, 608 and inverse discrete Fourier transform (IDFT) performs such modulation equivalently. Note that if the system adopts the strategy in Sourour, E. A.; Nakagawa, M. "Performance of Orthogonal Multicarrier CDMA in a Multipath Fading Channel", *IEEE Transactions on Communications*, pp. 356–367, March 1996, to expend the transmission diversity with a factor L, each sub-stream before spreading stage should be copied into L identical branches and these data-streams from the same user are then spread by the same spreading codes and transmitted via different sub-carriers. Thus, the number of sub-carriers in transmission is generally PL. The transmitted signal is, $$x(t) = \sum_{p=1}^{P} A b_p \sum_{f=1}^{F} c_f \varphi(t - fT_c) \sum_{l=1}^{L} e^{j2\pi f_{pl} t}, \, 0 \le t \le PT_s, \quad (4)$$

where $$K = \sum_{m=1}^{M} mK_m$$

is the number of effective users, and $\phi(t)$ is the unit-rectangular function with duration $T_c$, and $\Delta f = F/PT_s \cdot T_c \equiv T_s/F$.

2.2 Multi-rate MC-DS-CDMA

In the present invention, for multi-rate MC-DS-CDMA, two methods are disclosed, one is MC-accessed MC-DS-CDMA, and the other is VSL-accessed MC-DS-CDMA. In the MC-accessed MC-DS-CDMA, a data stream of a user is first multiplexed into different streams with basic rate and then each is treated as an individual (effective) user with individual spreading codes. In the VSL-accessed MC-DS-CDMA, the data stream from a user is directly S/P converted into sub-streams, where the number of carriers used in the system is still as in MC access, and spread by spreading codes with length corresponding to the data rate. The details of these two methods will be described hereinafter.

2.2.1 MC-accessed MC-DS-CDMA

Figure 7:
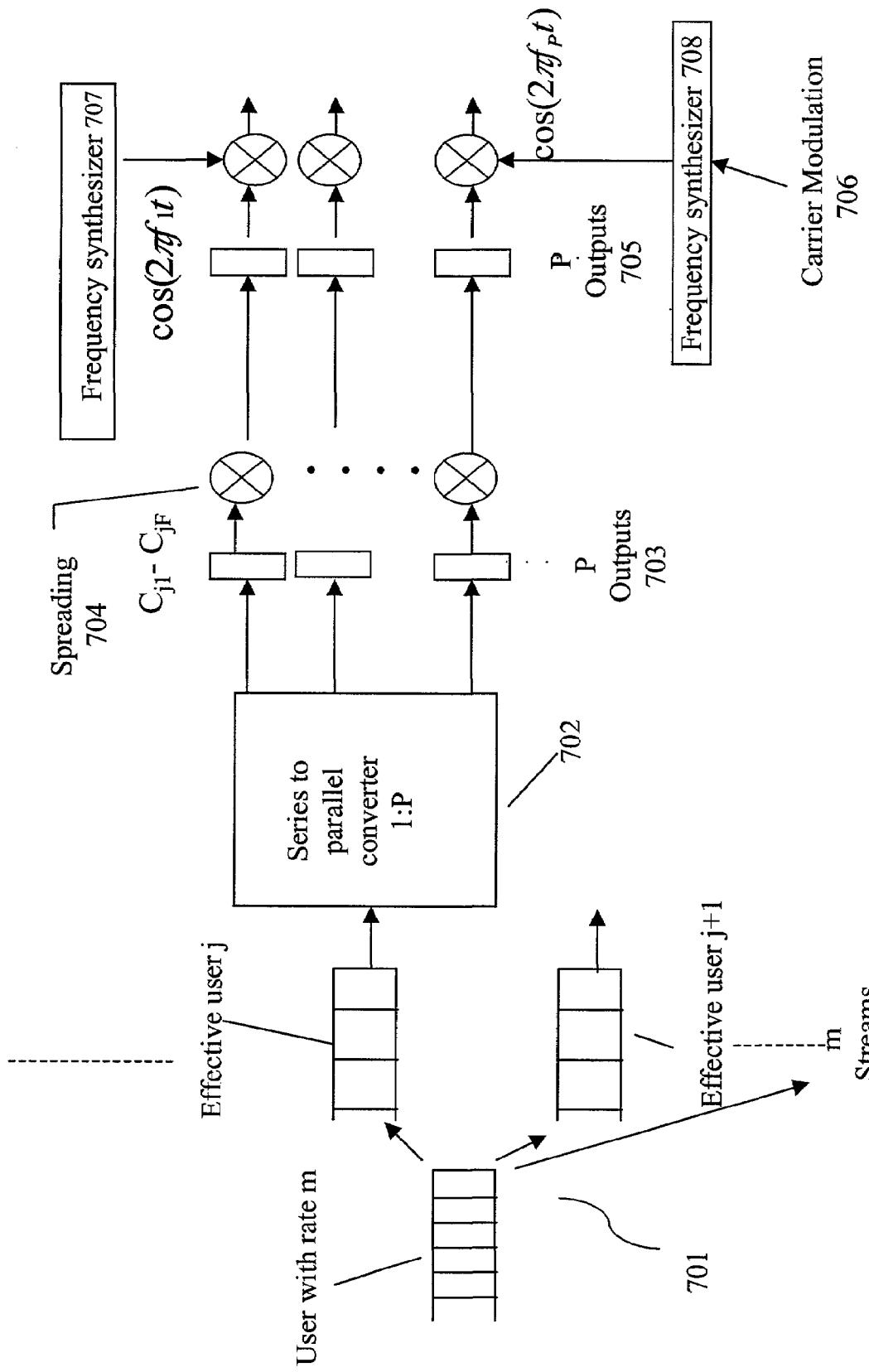
FIG. 7 illustrates an MC-accessed MC-DS-CDMA transmitter with a binary phase shift keying (BPSK) modulation scheme.

Referring to FIG. 7, an MC-accessed MC-DS-CDMA transmitter with a binary phase shift keying (BPSK) modulation scheme is illustrated. The data stream of rate m is first multiplexed into m different streams with basic rate (701) and each is treated as an individual (effective) user with individual spreading codes. Each stream is then S/P converted into P parallel sub-streams (703) through a serial to parallel converter (704), where P is the number of carriers used for transmission. At the spectrum-spreading stage, the sub-streams from the same effective user are spread by the same spreading codes with factor F via cyclically multiplying the codes (705) (time-domain spreading as conventional Direct-Sequence-Spread-Spectrum); however, they will be transmitted by different carriers. Combining all the corresponding parallel spread signals from other effective users, they are transmitted by orthogonal carriers respectively (706), where the carrier frequencies are synthesized from frequency synthesizers 707, 708 and inverse discrete Fourier transform (IDFT) can perform such modulation equivalently. Note that if the system adopts the strategy in Sourour, E. A.; Nakagawa, M. "Performance of Orthogonal Multi-carrier CDMA in a Multi-path Fading Channel", *IEEE Transactions on Communications*, pp. 356–367, March 1996, to expend the transmission diversity with a factor L, each sub-stream before spreading stage should be copied into L identical branches and these data-streams from the same effective user are then spread by the same spreading codes and transmitted via different sub-carriers. Thus, the number of sub-carriers in transmission is generally PL. The transmitted signal is, $$x(t) = \sum_{k=1}^{K} \sum_{p=1}^{P} A_k b_{kp} \sum_{f=1}^{F} c_{kf}\varphi(t - fT_c) \sum_{l=1}^{L} e^{j2\pi f_{pl}t}, \ 0 \le t \le PT_s, \quad (5)$$

where $$K = \sum_{m=1}^{M} mK_m$$

is the number of effective users, and $\phi(t)$ is the unit-rectangular function with duration $T_c$, and $\Delta f = F/PT_s$.

2.2.2 VSL accessed MC-DS-CDMA

Figure 8:
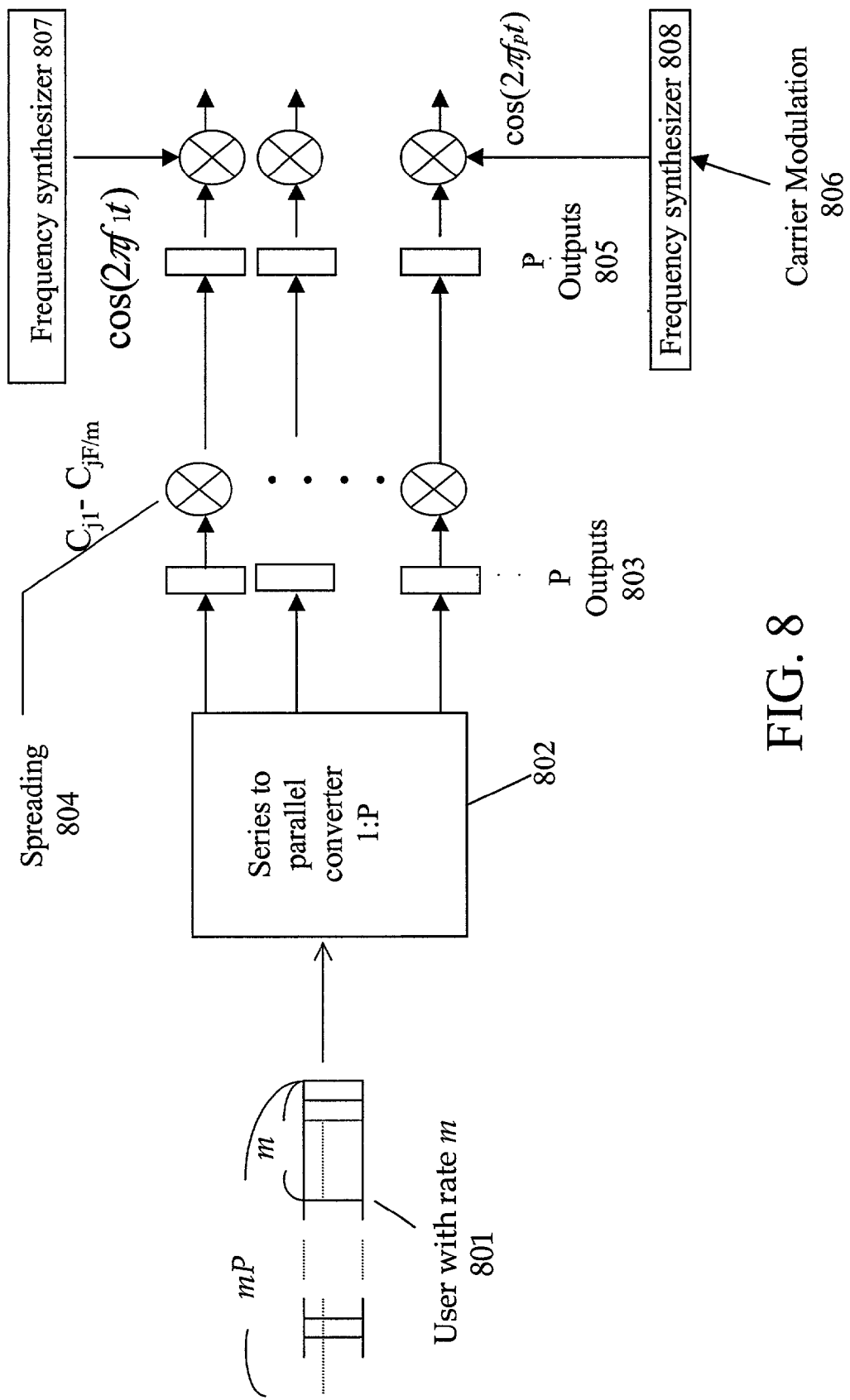
FIG. 8 illustrates a VSL-accessed MC-DS-CDMA transmitter with a binary phase shift keying (BPSK) modulation scheme.

With reference to FIG. 8, a VSL-accessed MC-DS-CDMA transmitter with a binary phase shift keying (BPSK) modulation scheme is illustrated. Regardless any date rate, the data stream (801) of each user is directly S/P converted into P sub-streams (802) by a serial to parallel converter (803). If the user is with rate m, all sub-streams are spread by cyclically multiplying the same spreading codes (804) (time domain spreading as conventional Direct-Sequence-Spread-Spectrum), where the spreading factor is F/m. After spread, the number of the sub-stream is still P (805). For multiuser transmission, combining all the corresponding parallel signals form other users, and they are transmitted via orthogonal carriers respectively (806), where modulation frequencies are synthesized from frequency synthesizers 807, 808 and Inverse Discrete Fourier Transform (IDFT) can perform such modulation equivalently. Also note that if the transmission diversity is expended with a factor L, each sub-stream before the spreading stage should be copied into L identical branches and these data-streams from the same user are then spread by the same spreading codes and transmitted by different sub-cariers. The number of sub-carriers in transmission is still generally PL. The transmitted signal is $$x(t) = \sum_{m=1}^{M} \sum_{k=1}^{K_m} \sum_{g=1}^{m} \sum_{p=1}^{P} A_{mk} b_{mkgp} \quad (6)$$

$$\sum_{f}^{F/m} c_{mkf}\varphi\left(t - fT_c - \frac{(g-1)PT_s}{m}\right) \sum_{l=1}^{L} e^{j2\pi f_{pl}t}, \ 0 \le t \le PT_s,$$

where $K_m$ is the number of users with rate m and $\Delta f = F/PT_s$.

3 Multi-rate MT-CDAM

3.1 MT-CDMA

The MT-CDMA transmitter spreads the S/P converted data streams using a given spreading code in the time domain so that the spectrum on sub-carriers have minimum frequency separation. In MT-CDMA, the original data stream with symbol duration $T_s$ is S/P converted to data streams with symbol duration $T = PT_s$. Then the S/P converted data streams are spread by the same signature waveform. Finally, each branch modulates a subcarrier for transmission. The separation between adjacent carriers satisfies the condition for orthogonality with respect to the symbol before spreading.

Figure 9:
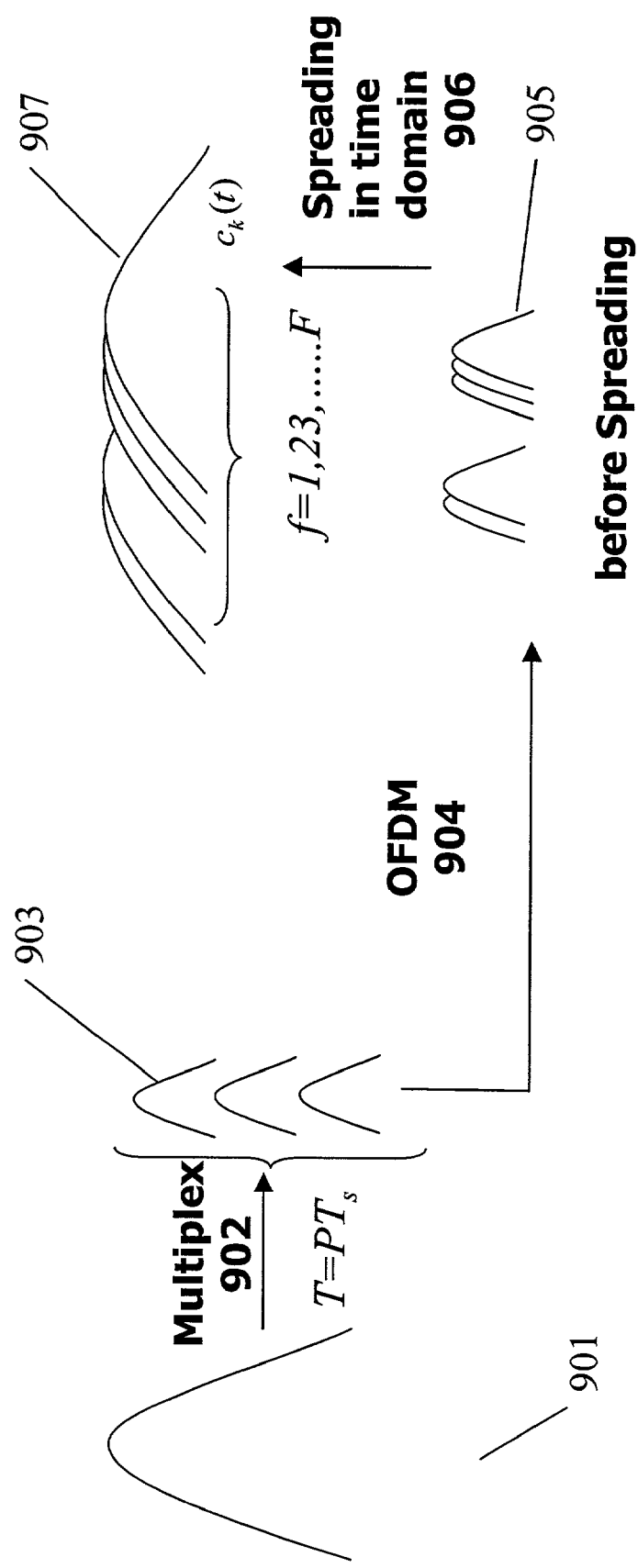
FIG. 9 is a schematic view showing the prior art frequency band change in different stages of MT-CDMA.

FIG. 9 is a schematic view showing the frequency band change in different stages of MT-CDMA. At first, an input data stream with a wider bandwidth (901) is multiplexed (902) into a plurality of sub-streams (903). The total bandwidth covered by all the sub-streams (903) is equal to the original bandwidth of the input data stream (901). Then all the sub-stream (903) are performed with orthogonal frequency division multiplexing (904) and then are spread in the "time domain" (instead of the frequency domain as in the case of MC-CDMA) and multiplexed for being transmitted (906).

Figure 10:
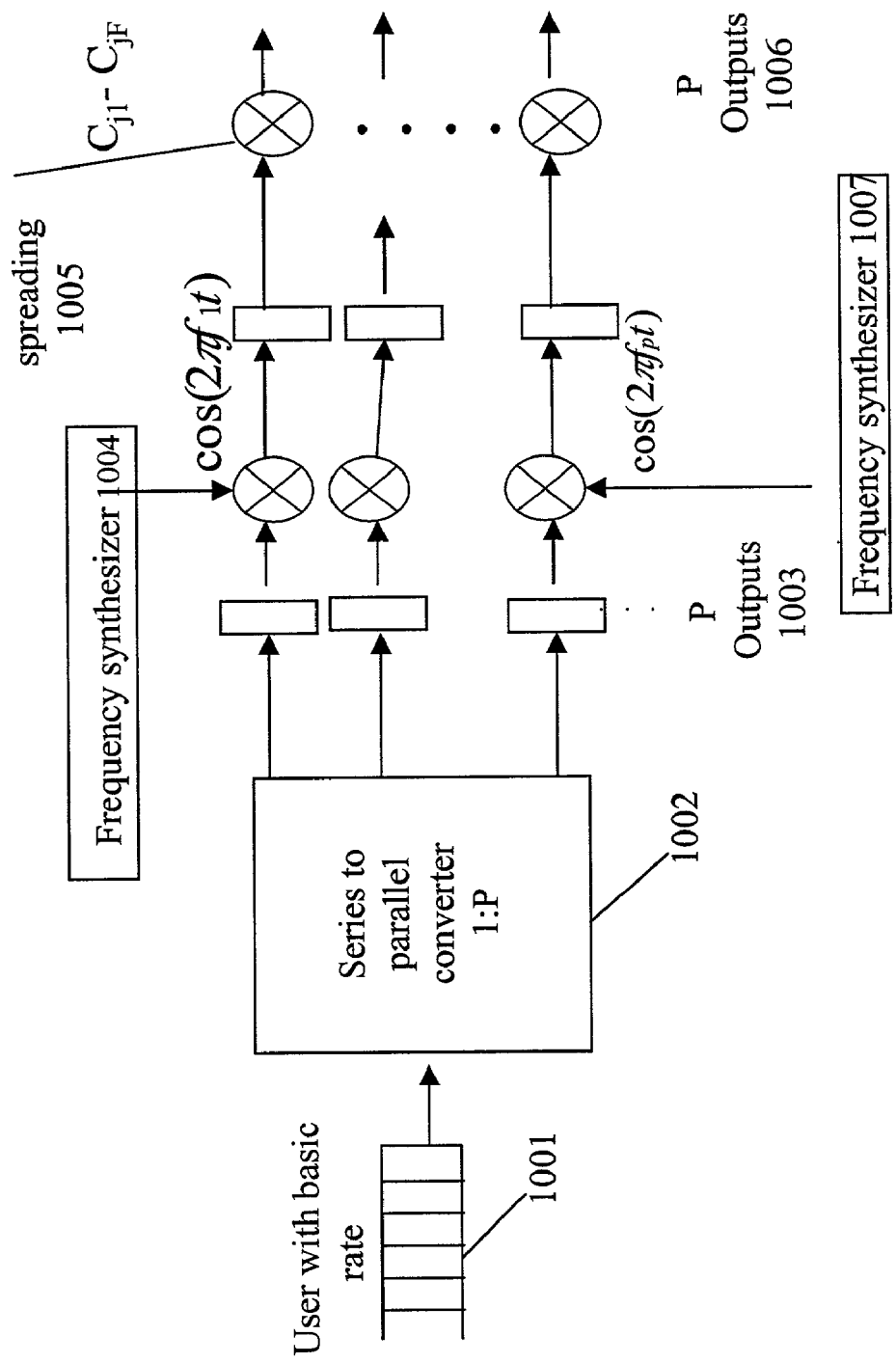
FIG. 10 illustrates an prior art MT-CDMA transmitter with a binary phase shift keying (BPSK) modulation scheme.

Referring now to FIG. 10, a multirate MT-CDMA transmitter of a single user with a binary phase shift keying (BPSK) modulation scheme is illustrated. The data stream (1001) with basic rate is input into a serial to parallel converter (1002) and is S/P converted to P outputs (1003), where P is the number of carriers used in the system. The P parallel outputs modulate P orthogonal sub-carriers from the frequency synthesizers (1004, 1007), where IDFT can perform such modulation equivalently and then being spread by identical spreading codes (1005) via cyclical multiplying the codes (time-domain spreading as in conventional Direct-Sequence-Spread-Spectrum), where the spreading factor is F. There are P outputs (1006) after spreading. Unlike in MC-DS-CDMA, they are transmitted respectively by carriers whose implicit orthogonality exists corresponding to the signals before spreading (1003), but with more condensed spectrum overlapping. The transmitted signal is $$x(t) = \sum_{p=1}^{P} A b_p \sum_{f=1}^{F} c_f \varphi(t - fT_c) e^{j2\pi f_p t}, \ 0 \le t \le PT_s, \quad (7)$$

where $\Delta f = 1/PT_s$.

3.2 Multi-rate MT-CDMA

3.2.1 MC-accessed MT-CDMA

Figure 11:
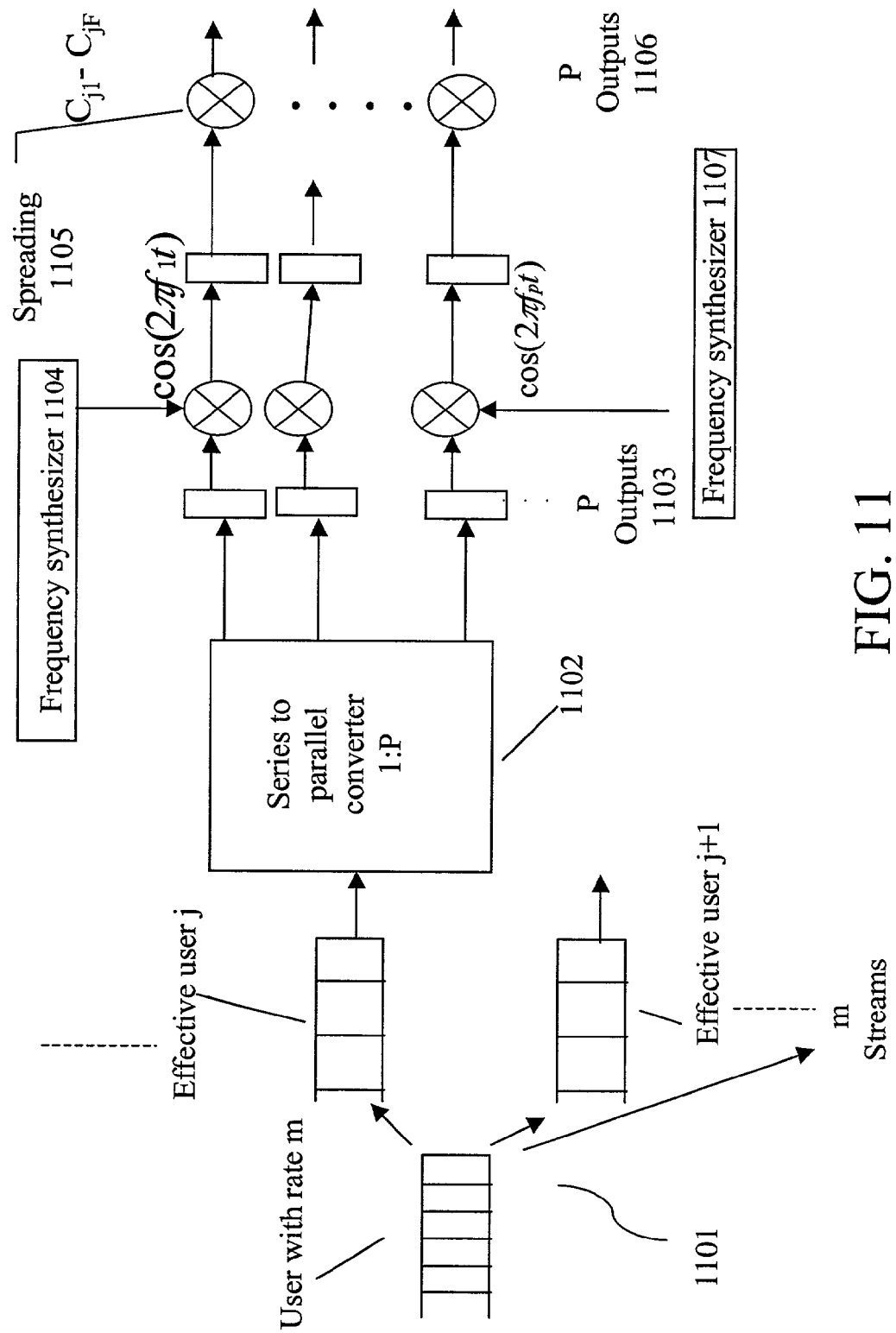
FIG. 11 illustrates an MC-accessed MT-CDMA transmitter with a binary phase shift keying (BPSK) modulation scheme.

FIG. 11 illustrates an MC-accessed MT-CDMA transmitter with a binary phase shift keying (BPSK) modulation scheme. The data stream of rate m is first multiplexed into m different streams with a basic rate (1101) and each is treated as an individual (effective) user and using individual spreading codes. Each stream is then S/P converted to P sub-streams at (1103) through the serial to parallel converter 1102, where P is the number of carriers used in the system. The P parallel sub-streams from the same effective user respectively modulate P orthogonal sub-carriers from the frequency synthesizers (1104, 1107), where the frequency separation is $1/PT_s$, and IDFT can perform such modulation equivalently. Then the modulated signals are spread by identical spreading codes via cyclical multiplying the codes (time-domain spreading as in conventional Direct-Sequence-Spread-Spectrum) (1105) and there are P parallel outputs (1106), where the spreading factor is F. Unlike in MC-DS-CDMA, they are thus transmitted respectively by carriers whose orthogonality exists corresponding to the signals before spreading (1103). The transmitted signal is $$x(t) = \sum_{k=1}^{K} \sum_{p=1}^{P} A_k b_{kp} \sum_{f=1}^{F} c_k \varphi(t - fT_c) e^{j2\pi f_p t}, \; 0 \leq t \leq PT_s, \quad (8)$$

where K is the number of total effective users and $\Delta f = 1/PT_s$.

3.2.2. VSL-accessed MT-CDMA

Figure 12:
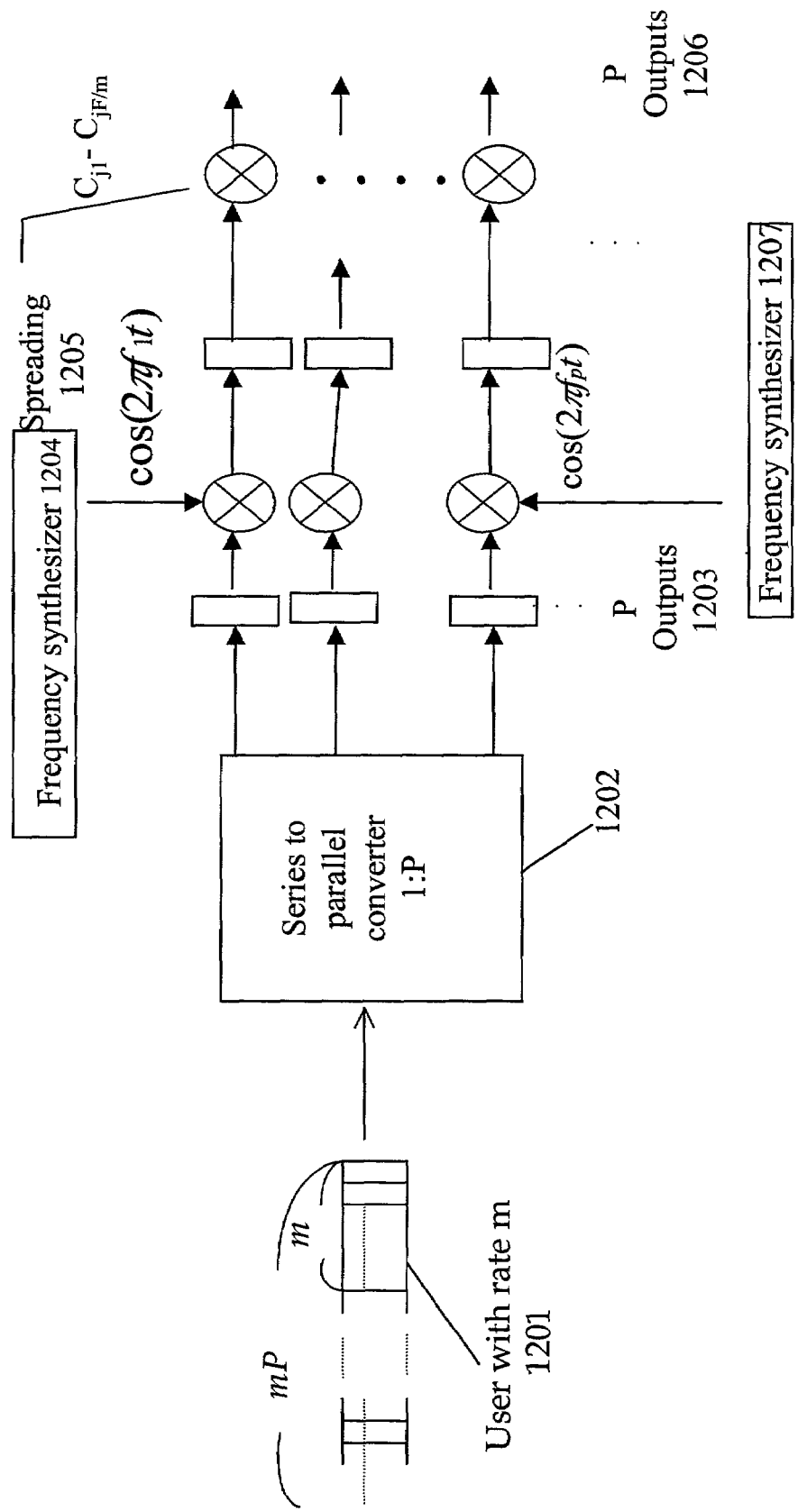
FIG. 12 illustrates a VSL-accessed MT-CDMA transmitter with a binary phase shift keying (BPSK) modulation scheme.

FIG. 12 illustrates a VSL-accessed MT-CDMA transmitter with a binary phase shift keying (BPSK) modulation scheme. The data stream (1201) from a user regardless any rate is S/P converted into P parallel sub-streams (1203) through a serial to parallel converter (1202), where P is the number of carriers used in the systems. The signals on the P sub-streams respectively modulate orthogonal sub-carriers from the frequency synthesizers (1204, 1207) with frequency separation $1/PT_s$, where IDFT can perform this modulation equivalently, and then they are spread by cyclical multiplying the spreading codes (time-domain spreading as in conventional Direct-Sequence-Spread-Spectrum) (1205) and thus after spreading there are P parallel outputs (1206), where the spreading is F/m for a user with rate m. The transmitted signal is $$x(t) = \sum_{m=1}^{M} \sum_{k=1}^{K_m} \sum_{g=1}^{m} \sum_{p=1}^{P} A_{mk} b_{mkgp} \sum_{f}^{F/m} c_{mkf} \varphi\left(t - fT_c - \frac{(g-1)PT_s}{m}\right) e^{j2\pi f_p t}, \quad (9)$$

$$0 \leq t \leq PT_s,$$

where $K_m$ is the number of users with rate m and $\Delta f = 1/PT_s$.

Figure 13:
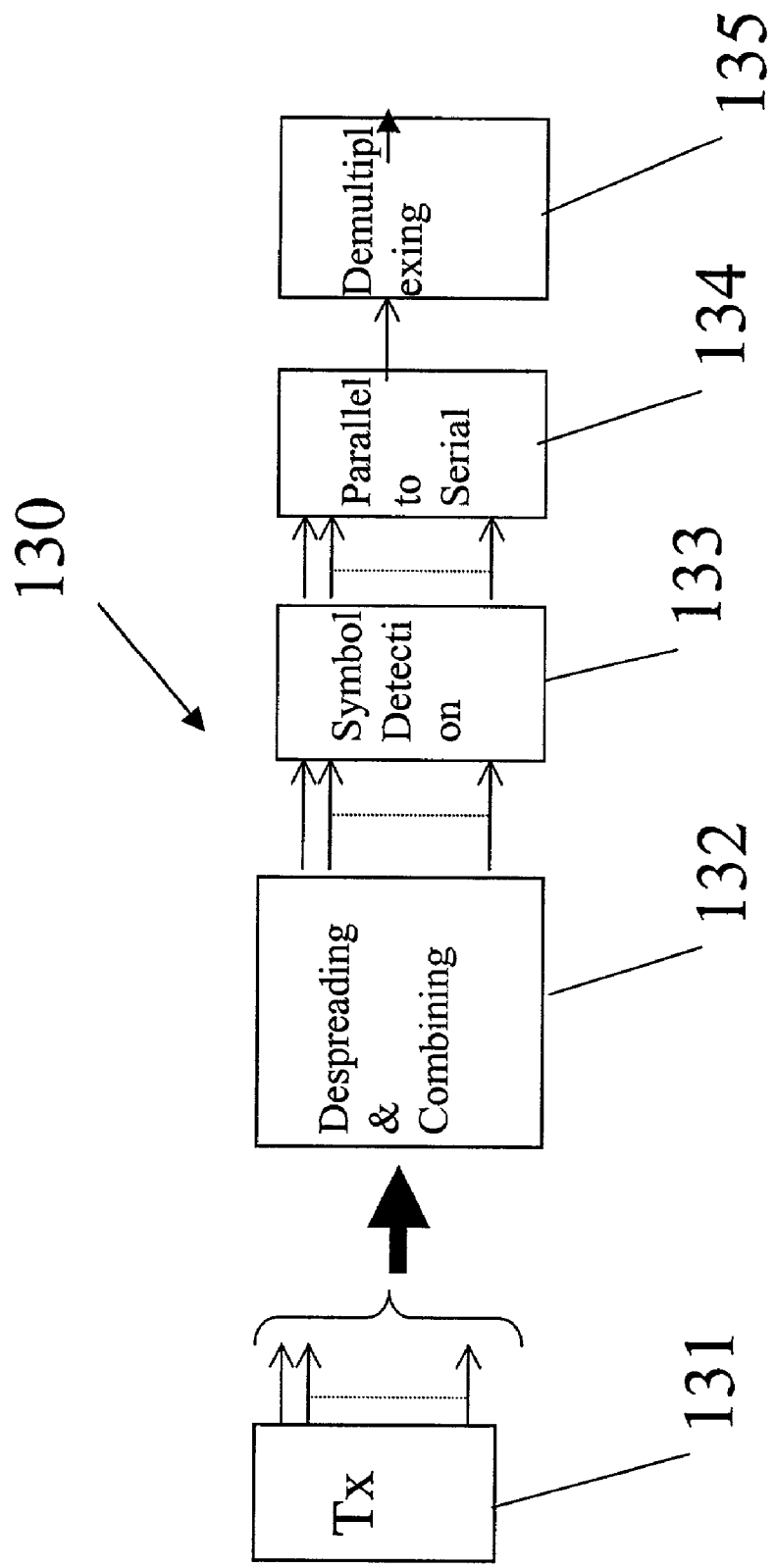
FIG. 13 shows a schematic block diagram of the receiver according to the present invention.

In the receiving aspect, a general structure at the baseband platform of the present invention is illustrated as FIG. 13. In general, the receiver performs inverse functions corresponding to those in the transmitter. After a modulated sequence is transmitted from the transmitter 131, it is received by the receiver 130. In the receiver 130, a received sequence is first de-spread and combined at (132), and then the de-spread and the combined sequence is transferred to a symbol detector 133 for detecting the symbol from the sequence. After the symbol is detected, it is sent to a parallel to serial converter 134 for restoring the original data stream (not shown).

The detailed architectures and functions of different scenarios are described in the following sections for both transmitter and receiver in programmable design.

4. Programmable Architecture

4.1 Programmable OFDM-CDMA transmitter

Figure 14:
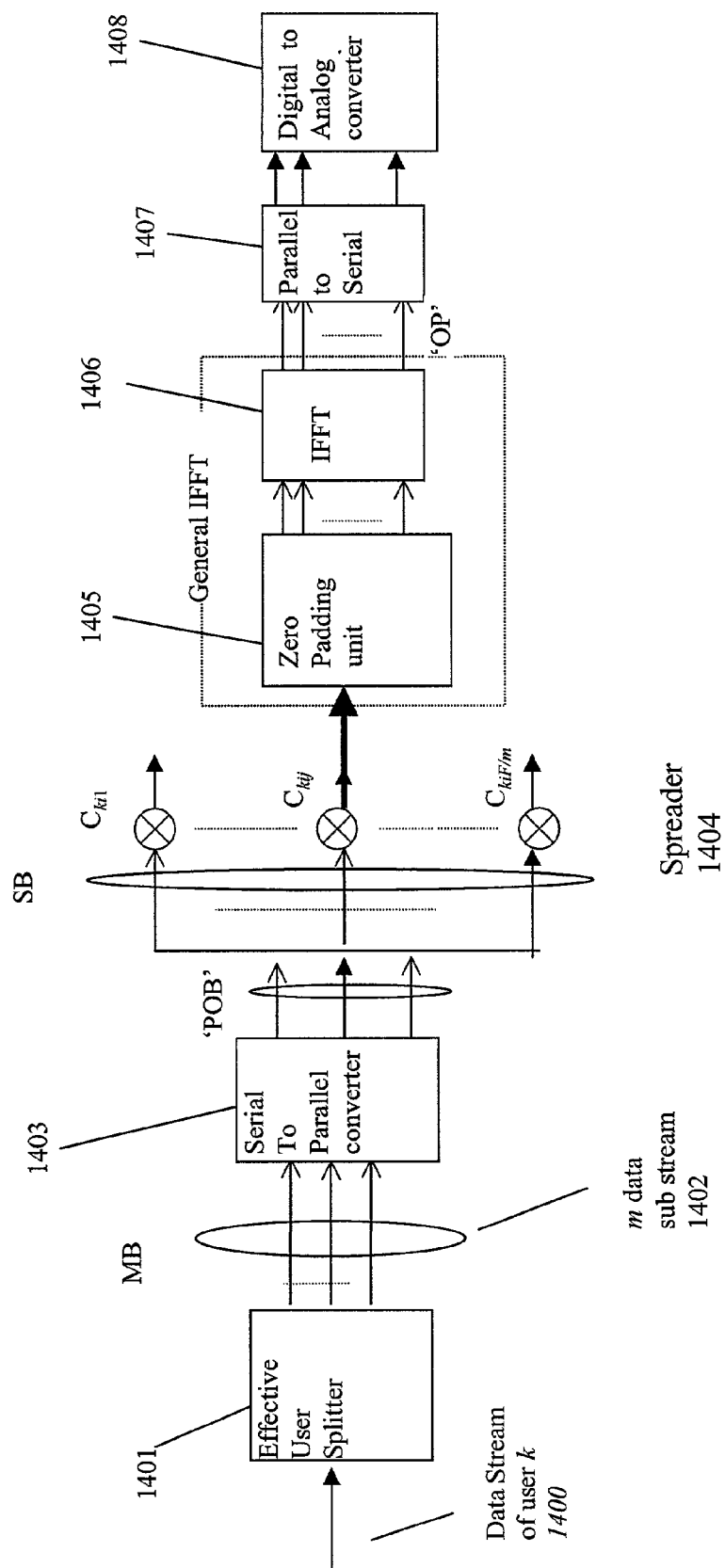
FIG. 14 shows the structure of the programmable multi-rate OFDM-CDMA transmitter.

The present invention's programmable OFDM-CDMA transmitter and receiver accommodates different system structures as one of the major features of software-defined radio. Two multi-rate access strategies and three OFDM-CDMA methods result in a total of six multi-rate OFDM-CDMA scenarios. The whole software architecture can be realized by a hardware structure of the present invention. Based on the system selection, appropriate parameters and subroutines can be chosen and adjusted to perform the transmitter and receiver functions. The proposed architecture of programmable transmitter is depicted in FIG. 13, which also shows the control unit. In operation, each unit has functions capable of being adjusted by certain parameters, which include: choice of access scheme, choice of adopted OFDM-CDMA type, data rates, and the spreading factors of each data stream. There remain some practical functions, such as insertion of guard time, that should operate, but the present invention focuses on the functions that are most related to the multi-rate transmission here. These functions are defined in the following description, as illustrated in FIG. 14.

An effective user splitter 1401 receives an input of data stream 1400 of user k with rate m times the basic data rate and determines the number of enabled Main Branches (MB). It is executed on a multiplexer (not shown) after receiving the data stream 1400 from a user. If the system is operated in multi-code access mode, it multiplexes the data stream 1400 into m sub-streams (1402) by enabling m branches. If it operates on VSL mode, the data stream (1400) is directly forwarded on one branch. A serial to parallel converter 1403 receives the sub-stream (1402) from the effective user splitter 1401 and determines how many Parallel Output Branches (POB) corresponding to the S/P ratio will be enabled and serial to parallel convert the sub-stream (1402) from the effective user splitter 1402 into P branches. Only under the scenario of VSL-MC-CDMA, POB is set to be mP; otherwise, POB is P. The serial to parallel converter 1403 transfers the branches from the serial to parallel converter 1403 to the following stages. A spreader 1404 receives an output from the serial to parallel converter 1403 and determines the number of enabled Sub-Branches (SB), which is a copy of the previous branch of each POB, and then determines the type of spreading (time-domain or frequency-domain spreading). If the scenario is MC-CDMA, the enabled SB is F for multi-code access and F/m for VSL access. If the scenario is MC-DS-CDMA and MT-CDMA, SB is L and 1 respectively for both access methods. Cyclical multiplying by corresponding codes (time-domain spreading) on each SB is set for MC-DS-CDMA and MT-CDMA. In MC-CDMA mode, signal on each SB multiplies one corresponding bit of spreading codes (frequency-domain spreading). A zero padding device 1405 is used for an IFFT operation to perform the equivalent modulation on orthogonal sub-carriers. To satisfy the required number of parallel inputs for IFFT operation, zero padding device 1405 serves for padding zeros according to the selected scenario, which results in regular padding for regular IFFT and circular-shift padding to perform NOC-IFFT. The length of circular shift is F points for MC mode and F/m points for VSL mode in MT-CDMA scenarios. For example, in radix-2 algorithm, the number of Padded Zeros (PZ) should be $2^{\lceil log_2 N_b \rceil} - N_b$ in regular IFFT, where $N_b$ denotes the number of parallel inputs. For NOC-IFFT operation in MT-CDMA modes, PZ should be $F(2^{\lceil log_2 N_b \rceil} - N_b)$ and allocated in circular-shift type. An IFFT processor 1406 received zero-padded data from the zero-padding device 1405 and decides the number of operation points (OP) in IFFT for each scenario. OP equals the number of outputs from the zero padding device 134 and performs an IDFT operation to the inputs and the outputting are said transformed samples. A parallel to serial converter 1407 receives the transformed samples from the IDFT processor 1406 with enabled input branches thereof and the conversion ratio corresponding to the selected scenarios, converting the transformed symbol into a serial data, and outputting said serial data stream. A digital to analog converter 1408 receiving said serial data stream from said parallel to serial converter for converting said serial data stream into an analog stream for transmission.

Figure 15:
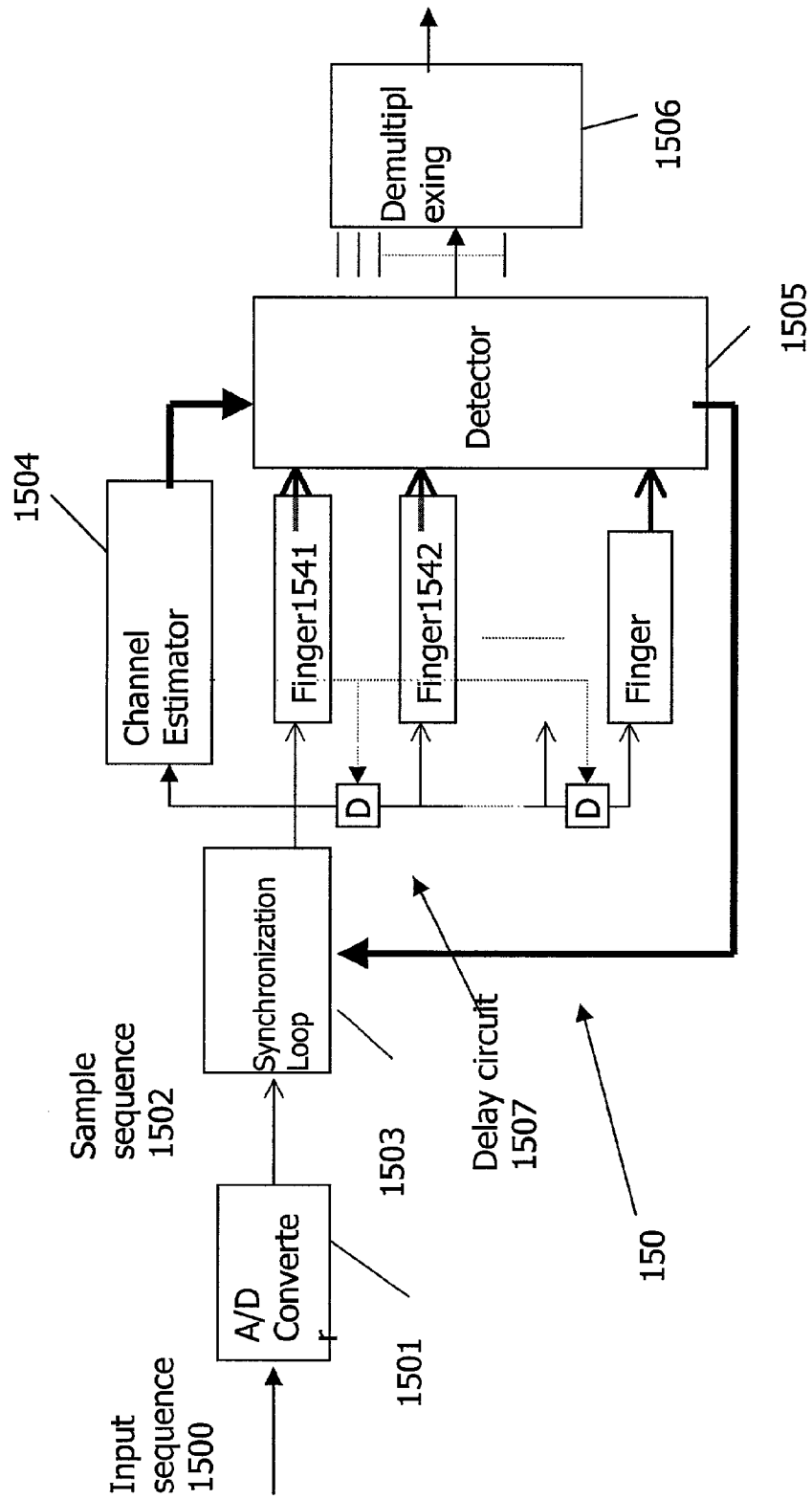
FIG. 15 shows structure of the programmable Rake receiver.

Table 1 summarizes the parameters in different scenarios, the operation period of IFFT, and the resultant bandwidth. The involved notations are defined as:
MC: multi-code, VSL: Variable-Spreading-Length
A: MC-CDMA, B: MC-DS-CDMA, C: MT-CDMA
m: data rate in unit of basic rate
F: spreading factor of a basic data-rate user
L: the diversity expansion of MC-DS-CDMA
CNS: constant bit multiplying, CYC: cyclical multiplying system scenarios. A software-based Rake receiver is illustrated in FIG. 15. The receiver comprises the following components as shown in FIG. 15. An analog to digital converter 1501 serves to control the sample rate of the received input analog sequence (1500) including the required number of input in the following FFT in response to a selected scenario, converting input analog sequence 1500 into an sample sequence 1502 and then outputting the converted digital sample sequence 1503. A rake receiver 150 comprises a synchronization loop 1503, a channel estimator 1504, a plurality of fingers 1541, 1541 . . . , a plurality of delay circuit 1507, and a detector 1505. From the principle of OFDM transmission, the number of sub-carriers is generally selected that signals on each sub-band suffer from frequency-nonselective fading. Therefore, only one finger is sufficient for most cases. However, there may be some situations that the fading in sub-bands is difficult to maintain as frequency-nonselective. Thus, the number of turned-on fingers could be a pre-defined value or be controlled by the result of channel estimation to combat multi-path effect. The delays between fingers are also adjusted according to the estimation result.

Figure 16:
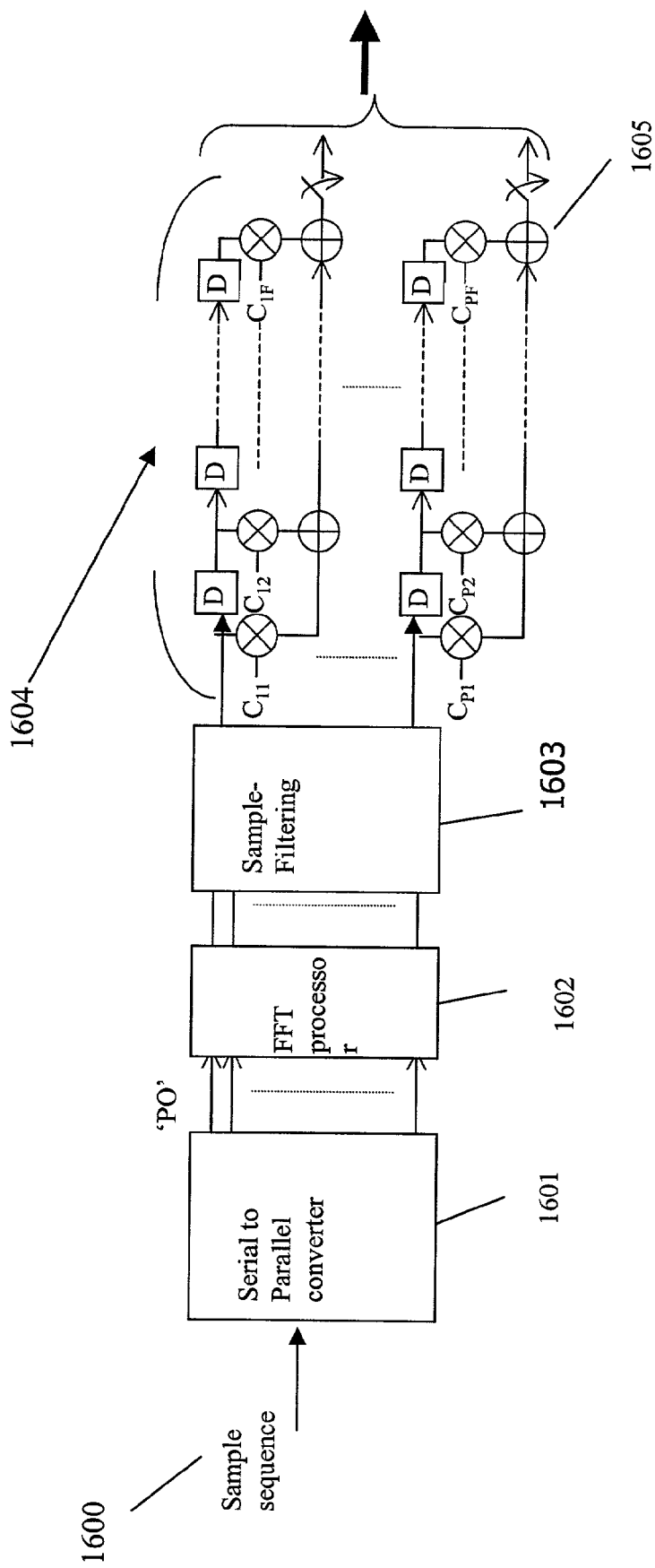
FIG. 16 shows the general srncture of the finger in the Rake receiver for programmable multi-rate OFDM-CDMA receiver.

FIG. 16 depicts the programmable structure of the fingers, where eight components are defined. The decision of symbol detection could be used for next step synchronization if the precision is high enough. These functions are defined in FIG. 16. A serial to parallel converter 1601 serves to determine the ratio of S/P conversion and the number of parallel outputs (PO) according to the selected scenario, and con-

TABLE 1

| scenario | MB | POB | SB | PZ | OP | Period | Bandwidth |
|---|---|---|---|---|---|---|---|
| (A, m, MC) | m | P | F; CNS | $2^{\lceil log_2(PF) \rceil} - PF$ regular | $2^{\lceil log_2(PF) \rceil}$ | $PT_s$ | $\frac{PF - 1}{PT_s} + \frac{1}{T}$ |
| (A, m, VSL) | 1 | mP | F/m; CNS | $2^{\lceil log(_2PF) \rceil} - PF$ regular | $2^{\lceil log(_2PF) \rceil}$ | $PT_s$ | $\frac{PF - 1}{PT_s} + \frac{1}{T}$ |
| (B, m, MC, L) | m | P | L; CYC | $2^{\lceil log(_2PL) \rceil} - PL$ regular | $2^{\lceil log(_2PL) \rceil}$ | $PT_s/F$ | $\frac{(PL - 1)F}{PT_s} + \frac{1}{T}$ |
| (B, m, VSL, L) | 1 | P | L; CYC | $2^{\lceil log_2(PL) \rceil} - PL$ regular | $2^{\lceil log_2(PL) \rceil}$ | $PT_s/F$ | $\frac{(PL - 1)F}{PT_s} + \frac{1}{T}$ |
| (C, m, MC) | m | P | 1; CYC | $F(2^{\lceil log_2 P \rceil} - P)$ circular-shift(F) | $F2^{\lceil log_2 P \rceil}$ | $PT_s/F$ | $\frac{P - 1}{PT_s} + \frac{1}{T}$ |
| (C, m, VSL) | 1 | P | 1; CYC | $F(2^{\lceil log_2 P \rceil} - P)$ circular-shift(F/m) | $F2^{\lceil log_2 P \rceil}$ | $PT_s/F$ | $\frac{P - 1}{PT_s} + \frac{1}{T}$ |

According to the scenario selection, appropriate parameters and subroutines are chosen and adjusted to perform these functions by micro-controller or by DSP. Briefly, these parameters determine the number of enabled hardware branches, the diversity in transmission, zero padding, the time-domain or frequency-domain spreading, and the spectrum profile.

4.2 Programmable OFDM-CDMA receiver

In the same manner as for transmitting, there are six receiving variations that should be accommodated for six verts the digital sample sequence from the analog to digital converter 1501 into a plurality of parallel data, and then output said parallel data. A general FFT (GFFT) device consists of a FFT processor (1602) and a sample filter (1063) and decides which type of FFT will be executed. It includes two sub-functions where the first determines the operation points of FFT device and the second performs circular-shift-window filtering for outputting of the FFT device (1062). General FFT operates in NOC mode for MT-CDMA and by disabling the first sub-function to run regular mode for MC-CDMA and MC-DS-CDMA. Then the FFT processor outputs the transformed data. A sample filter 1603 has an input from the FFT processor 1602 and serves for controlling the filtering of samples after FFT to discard the signals out of the desired sub-bands and determines the following enabled tapped-delay-lines. The pass window (PSW) of sample filtering equals the number of sub-carriers used in transmission. A despreader 1604 has inputs from the sample filter 1603 and is used in the despreading stage such that each output of sample filter 1603 is despread according to the spreading type (constant or cyclic type) of the selected scenario by multiplying the corresponding codes. The despreading structure is a tapped-delay-line (TDL) form and the number of enabled TDL equals the sample filtering window in sample filter 1603. The despreader 1604 determines the number of enabled tap (ET) and the time spacing (TS) of each tap. For MC-CDMA modes, only one tap is needed and each line corresponds to one bit of the spreading codes. For MC-DS-CDMA and MT-CDMA modes, the number of taps in each line equals the spreading factor. A sampler 1605 has an input from the output at each line of the despreader 1604 and determines the sampling rate (SR) for taking samples on each line at the despreading stage. The sampling rate equals the OFDM symbol duration and then output a sampling output. Returning to FIG. 15, the detector 1505 has the inputs from the channel estimator 1504, at least one of the fingers 1541, 1542, etc., and makes symbol decisions by combining these inputs, based on the collection of samples from each line of all fingers 1541, 1542, etc. Then the detector 1505 outputs detecting results to the demultiplexer 1506 as it detects the required signal, while it informs the synchronous loop 1503 the detecting results. The different combining methods used by detector 1505 can utilize DSP in this stage. Demultiplexer 1506 receives an output from the detector and controls the de-multiplexing in multi-code mode to reconstruct the original data sequence from the effective streams.

*media communications,* Artech House, 2000. However, the introduction of multi-rate traffic challenges the power AMP severer. Among these scenarios, multi-code access may cause larger instant power due to its concept of parallel transmission. Therefore, a power AMP whose linear range could accommodate the largest requirement of multi-rate transmission under the aid of PAP reduction mechanisms is selected.

To eliminate the inter-symbol interference and inter-carrier interference, a guard time $T_g$, which is larger than the multi-path spread of channels, should be added on each OFDM symbol after P/S conversion in the transmitter and the corresponding removing should exist before S/P conversion in the receiver. After cyclic guard time extension, the OFDM symbol duration T will be $PT_s+T_g$ in MC-CDMA, and $PT_s/F+T_g$ in MC-DS-CDMA and MT-CDMA. In addition, to improve the performance, some techniques such as forward error control (FEC) and interleaving could be easily added to this structure without any difficulty.

Although the design of the present invention focuses on multi-rate applications, this architecture is backward compatible to single rate OFDM-CDMA systems by setting m=1, to DS/CDMA systems by setting P=L=1 in MC-DS-CDMA mode, and to conventional OFDM systems by setting F=L=1 in single user case. Due to the occupied bandwidth of each OFDM-CDMA systems is kept fixed for users of any rate in both MC access and VSL access modes, multi-rate applications do not increase the requirement on some hardware devices, such as the sampling rate of A/D and the bandwidth of low-pass filter.

Processing delay is a challenge in OFDM systems, especially sensitive in real-time applications. In fact, this programmable transceiver supports the possibility that the number of sub-carriers could be adjusted dynamically according to the channel conditions such that the least sub-carriers attain frequency-nonselective fading at each sub-channel. In

TABLE 2

|  | Sample Rate | PO | IFFT | PSW | ET; TS | SR |
|---|---|---|---|---|---|---|
| (A, m, MC) | $2^{\lceil \log_2(PF) \rceil}/PT_s$ | $2^{\lceil \log_2(PF) \rceil}$ | Regular | PF | 1; 0 | $1/PT_s$ |
| (A, m, VSL) | $2^{\lceil \log_2(PF) \rceil}/PT_s$ | $2^{\lceil \log_2(PF) \rceil}$ | Regular | PF | 1; 0 | $1/PT_s$ |
| (B, m, MC, L) | $F2^{\lceil \log_2(PL) \rceil}/PT_s$ | $2^{\lceil \log_2(PL) \rceil}$ | Regular | PL | F; $PT_s/F$ | $1/PT_s$ |
| (B, m, VSL, L) | $F2^{\lceil \log_2(PL) \rceil}/PT_s$ | $2^{\lceil \log_2(PL) \rceil}$ | Regular | PL | F/m; $PT_s/F$ | $m/PT_s$ |
| (C, m, MC) | $F2^{\lceil \log_2 P \rceil}/PT_s$ | $2^{\lceil \log_2 P \rceil}$ | NOC | P | F; $PT_s/F$ | $1/PT_s$ |
| (C, m, VSL) | $F2^{\lceil \log_2 P \rceil}/PT_s$ | $2^{\lceil \log_2 P \rceil}$ | NOC | P | F/m; $PT_s/F$ | $m/PT_s$ |

The software architecture of the present invention's programmable multi-rate OFDM-CDMA transceiver can be realized by the general hardware structure described in K. C. Chen and S. T. Wu, "A Programmable architecture for OFDM-CDMA," *IEEE Communication Magazine,* pp. 76–82, November 1999, as an extension. Different scenarios have different requirement of bandwidth and sampling rate. Due to the accommodation of the six multi-rate OFDM-CDMA scenarios, it forces the specification of the D/A converter and the low-pass filter should satisfy all the requirements. Thus, the D/A converter should support input rate higher than any possible sampling rate and the bandwidth of the low-pass filter should accommodate all scenarios. Another practical issue is the peak-to-average power (PAP) ratio problem, which causes the inefficiency of power amplifiers in RF. The PAP problem exists inherently in OFDM systems and can be reduced by techniques such as signal distortion, error correcting, and scrambling, referring to R. Van. Nee, and R. Prasad, *OFDM for wireless multi-* the same way, delay-sensitive data transmission is realizable by reducing the number of sub-carriers with the aid of more fingers in Rake receiving.

A transceiver architecture of multi-rate OFDM-CDMA systems is illustrated and showed its programmability such that the general system can operate under different scenarios with a common hardware structure and reconfigure by software implementation.

6. Description of NOC-IDFT and NOC-DFT Algorithm

Preliminary

To generate the multi-rate signal that has a condensed spectrum, such as an MT-CDMA signal, NOC-IFFT can suffice. NOC-IFFT consists of two parts, the former concludes some signal processing such as zero-padding and sample arrangement, and the latter is a regular FFT device. On the other hand, NOC-FFT is the same methodology as NOC-IFFT, used for extracting signals on different carriers from the OFDM signals. IFFT and FFT are the special cases of NOC-IFFT and NOC-FFT respectively.

For the kth user in MT-CDMA systems, the transmitted signals after modulation is $$x_k(t) = \sum_{p=1}^{P} b_{kp} \sum_{f=1}^{F} c_{kf} \varphi(t - fT_c) e^{j2\pi f_p t} = \sum_{f=1}^{F} x_{kf}(t), 0 \leq t \leq T, \quad (A.1)$$

where $\Delta f \equiv f_{i+1} - f_i = 1/PT_s$ and the discrete equivalent form of $x_{kf}(t)$ is:

$$x_{kf}[n] = \sum_{p=1}^{P} d_{kp}[f] e^{j2\pi((f-1)P+p)n/N}, \quad (A.2)$$

$$(f-1)T_c \leq t \leq fT_c, \text{ for } n = 1 \sim N,$$

where $d_{kp[f]} = b_{kp} c_{kf}$, and $T_c = T/F$.

In definition

Let N, $N_s$, F∈integer and F=N/$N_s$, N point NOC-IDFT of a sequence s[i], i=1~$N_s$, is a sequence of vector $X_1$, $X_2$, ... $X_F$, where $X_f = [x_f[1], x_f[2], \ldots x_f[N]]^T$, which is generated by:

For $f = 1, 2, \ldots, F$, $$s'[i] = \begin{cases} S[i - (f-1)N_s], & (f-1)N_s + 1 \leq i \leq fN_s \\ 0, & \text{otherwise} \end{cases} \quad (1)$$

$$x_f[n] = \sum_{i=(f-1)N_s+1}^{fN_s} s'[i] \exp\left(j2\pi \frac{in}{N}\right), \text{ for } n = 1, 2, \ldots N. \quad (2)$$

The above definition is denoted as $F_{NOC}^{-1}\{s[i], i=1\sim N_s; N,F\}$, the NOC-IDFT of the sequence s[1], s[2], ..., s[$N_s$], with parameters (N,F).

Therefore, if N=FP, then (A.2) can be alternatively $$x_{kf}[n] = F_{NOC}^{-1}\{d_{k1}[f], \ldots, d_{kP}[f]; (N, F)\}$$

In fact, from the second step of the definition, $x_{f[n]} = F^{-1}\{s'[1], s'[2], \ldots, s'[n]; N\}$, where $F^{-1}\{\ldots;N\}$ denotes N-point regular IDFT. Therefore, circular-shift zero padding (the first step of the definition) and regular IFFT can implement NOC-IFFT. Disabling of circular-shift zero padding returns the system to regular IFFT processing. For receiving in MT-CDMA systems (as described in Sourour, E. A.; Nakagawa, M. "Performance of Orthogonal Multicarrier CDMA in a Multi-path Fading Channel", *IEEE Transactions on Communications*, pp. 356–367, March 1996), define the NOC-DFT corresponding to NOC-IDFT then by a definition:

Let N, $N_s$, F∈integer and F=N/$N_s$, F points NOC-DFT of a sequence of vector $X_1, X_2, \ldots X_F$, where $X_f = [x_f[1], x_f[2], \ldots x_f[N]]^T$, is a sequence s[i], i=1~$N_s$, which is generated by:

For $f = 1, 2, \ldots, F$,
s'[n]=F{$X_{f;N}$, n=1,2, ..., N.(1)
s[i]=s'[i+(f-1)$N_s$], for i=1,2, ..., $N_s$.(2)

where F{ ... ; N} denotes the regular N points DFT.

The above definition is denoted as $F_{NOC}\{X_1, X_2, \ldots, X_F; N, F\}$, the NOC-DFT of a sequence of vector $X_1, X_2, \ldots X_F$ with parameters (N,F).

Then regular FFT and shift-windowing can also implement NOC-FFT. Therefore, sampling the received signal with rate N/FTc, serial-to-parallel converting with ratio N/F, and taking NOC-FFT with parameter (N,F) period T will demodulate the MT-CDMA signal as (A.2).

While the above is a full description of the specific embodiments, various modifications, alternative constructions and equivalents may be used. Further, any combination of the factors described above that can be taken into consideration to optimize locating precision are within the scope of the present invention. Therefore, the above description and illustrations should not be taken as limiting the scope of the present invention which is defined by the appended claims.

What is claimed is:

1. A method for multiplexing and multiple accessing a multi-rate OFDM-CDMA system with an input data stream having a data rate of a predetermined value m, said m being a multiple of a basic rate and said multi-rate OFDM-CDMA system having a plurality of predetermined spreading codes and a plurality of orthogonal carrier, said input data stream having a selected number of data being m×P wherein P is an integer, and each data representing a symbol having a predetermined sample duration, said method comprising the steps of:
    (a1) multiplexing said input data stream into m effective data sub-streams each having a data rate equal to said basic rate and having P data;
    (a2) performing an OFDM operation on each of said m effective data sub-streams, wherein said OFDM operation comprising:
    (b1) serial-to-parallel converting each of said m data sub-streams into P parallel data in each sub-stream; and
    (b2) copying said representative symbol of each data into F branches indicating from a first branch to a $F^{th}$ branch, wherein F is an integer and a constant spreading factor of said plurality of spreading codes; and
    (a3) performing a CDMA operation on each of said P×F wherein F is a spreading factor of a basic data-rate user, and an integer effective data sub-streams being performed with OFDM operation.

2. The method of claim 1, wherein said step a(3) further comprises the step of utilizing a frequency domain spreading in said CDMA operation further comprising the steps of:
    (c1) spreading said representation symbol at each of said F branches as a spread symbol in the frequency domain by utilizing a predetermined bit in a selective one of said plurality of spreading codes, thereby, for each effective data sub-stream, there being P×F spread symbols which are indicated as a first, a second, and a P×$F^{th}$ spread sub-branches, respectively;
    (c2) combining $i^{th}$ spread symbol of each of the effective data sub-stream as an $i^{th}$ combined symbol, where i is from 1 to P×F;
    (c3) modulating P×F orthogonal carriers by said P×F combined symbol as modulated sub-carriers; and
    (c4) transmitting said plurality of modulated sub-carriers, wherein a frequency difference of two adjacent carriers of said plurality of P×F orthogonal carriers is an inverse of the product of said P multiplied with said symbol duration.

3. The method of claim 2, wherein in step (c2), said modulation performed on orthogonal carriers is executed by using inverse discrete Fourier transform.

4. The method of claim 1, wherein said step (a3) further comprises the step of utilizing a time spreading in said CDMA operation having the steps of:
  (d1) spreading said representation symbol of each of said P data in time domain so as to acquire a spread symbol by utilizing a selected one of said plurality of spreading codes via cyclically multiplying said codes; thereby, for each effective data sub-stream, there being P spread symbols which are indicated as a first, a second, and a $P^{th}$ spread sub-branches, respectively;
  (d2) combining $i^{th}$ spread symbol of each of the effective data sub-streams as an $i^{th}$ combined symbols, where i is from 1 to P;
  (d3) modulating P orthogonal carriers by said P combined symbols as modulated sub-carriers; and
  (d4) transmitting said modulated sub-carriers.

5. The method of claim 4, wherein in step (d2), inverse discrete Fourier transform is utilized to perform said modulation on orthogonal carriers.

6. The method of claim 1, wherein said step a(3) further comprises the step of utilizing a time spreading in said CDMA operation having the steps of:
  (e1) spreading said representation symbol of each of said P data in time domain so as to acquire a spread symbol by utilizing one selected spreading code of said plurality of spreading codes via cyclically multiplying said codes; thereby, for each effective data sub-stream, there being P spread symbols which are indicated as a first, a second, and a $P^{th}$ spread sub-symbol, respectively;
  (e2) combining $i^{th}$ spread symbol of each of the effective data sub-streams as an $i^{th}$ combined sub-symbols, where i is from 1 to P;
  (e3) modulating P orthogonal carriers by said P c ombined symbols as modulated sub-carriers wherein frequency difference of two adjacent carriers is an inverse of the product of P multiplied with a symbol duration of said data stream with a basic rate; and
  (e4) transmitting said modulated sub-carriers.

7. The method of claim 6, wherein in step (e2), NOC-IDFT is utilized to perform said modulation by orthogonal carriers.

8. A method for multiplexing and multiple accessing a multi-rate OFDM-CDMA system with an input data stream having a data rate of a predetermined value m, said m being a multiple of a basic rate and said multi-rate OFDM-CDMA system having a plurality of predetermined spreading codes and a plurality of orthogonal carrier; said input data stream having a selected number of data, being m×P, wherein P is an integer and each data representing a symbol having a predetermined sample duration, said method comprising the steps of:
  (A1) serial-to-parallel converting each data stream into P×m data;
  (A2) copying each of said symbols into F/m branches, wherein F/m is a constant length of said plurality of spreading codes, and F is selected to cause F/m to be an integer;
  (A3) spreading said symbol at each branch in frequency domain by a predetermined bit of a selective one of said spreading codes so as to acquire an spread branch; and
  (A4) modulating all said spread branch by a plurality of orthogonal carriers and combining all the modulated parallel signals for transmission; wherein frequency difference of two adjacent carriers is an inverse of the product of P multiplied with a symbol duration of said data stream with basic rate.

9. The method of claim 8, wherein in step (A4), inverse discrete Fourier transform is utilized to perform said modulation on orthogonal carriers.

10. A method for multiplexing and multiple accessing a multi-rate OFDM-CDMA system with an input data stream having a data rate of a predetermined value m, said m being a multiple of a basic rate and said multi-rate OFDM-CDMA system having a plurality of predetermined spreading codes each having length F/m and a plurality of orthogonal carriers, said input data stream having a selected number of data being m×p, and each data representing a symbol having a predetermined sample duration, said method comprising the steps of:
  (C1) serial-to-parallel converting each data stream into P data sub-streams; and
  (C2) spreading each sub-stream in time domain by cyclically multiplying said same spread codes so as to acquire P spreading sub-streams which are indicated from a first spread sub-stream to $p^{th}$ spread sub-stream; wherein F is selected so that F/m is an integer, said F/m is a constant spreading factor of the spread spectrum operation of said system.

11. The method of claim 10, further comprising a step after step (C2) of modulating said P orthogonal carriers by said P spread sub-streams and combining all the P parallel signals for transmission.

12. The method of claim 11, wherein inverse discrete Fourier transform is utilized to perform said modulation.

13. The method of claim 10, further comprising a step after step (C2) of modulating said P orthogonal carriers by said P spread sub-streams and combining all the P parallel signals for transmission, wherein frequency difference of two adjacent carriers is an inverse of a result of P multiplied with a symbol duration of said data stream with basic rate.

14. The method of claim 13, wherein NOC-IDFT is utilized to perform said modulation on carriers.

15. A programmable OFDM-CDMA transmitter for transmitting both multi-rate signals and single rate signals of three access systems, MC-CDMA, MC-DS-CDMA, MT-CDMA; said programmable OFDM-CDMA transmitter receiving an input data stream with a data rate of m being a multiple of a basic rate and being operated in a plurality of pre-selected modes containing a multi-code a ssessing mode and a VSL-code access mode and each mode including a plurality of scenarios containing an MC-CDMA scenario, a MC-DS CDMA scenario, and a MT-CDMA scenario; said input data stream having a selected number of data, P, wherein P is an integer further said OFDM-CDMA transmitter having a plurality of spreading codes with a predetermined spreading factor corresponding to a plurality of spreading codes and spreading factors in said OFDM-CDMA transmitter and each data representing a symbol having a predetermined sample duration, comprising:
  an effective user splitter for determining the number of enabled sub-streams after receiving said data stream responsive said mode of said input data stream, splitting said data stream into a plurality of data sub-streams and outputting said data sub-streams;
  a serial to parallel converter having a serial to parallel ratio for receiving said data sub-stream from said effective user splitter and determining the number of parallel outputs responsive to said serial to parallel ratio and serial-to-parallel converting each data sub-stream into a plurality of data; and outputting said data;
  a copying and spreading unit for determining the number of enabled branches responsive to said spreading factor, and receiving said data outputted from said serial to parallel converter for copying said symbol representing data outputted from said serial-to-parallel converter into a plurality of branches and spreading said symbol representing said data at each branch as a spread branch; outputting said spread branches;

a zero padding and IFFT processor for receiving said spread branches outputted from said copying and spreading unit for determining the number of operation points in IFFT for each scenario responsive to said spreading factor, and performing a regular-zero padding to sa i branch for executing a regular IFFT operation responsive to a multi-rate MC-CDMA, a multi-rate MC-DS-CDMA or performing a circular-shift padding for an NOC-IFFT operation responsive to a multi-rate MT-CDMA, thereby, acquiring a transformed symbol, and outputting said transformed symbols;

a parallel to serial converter for receiving said transformed symbols from said zero padding and IFFT processor and determining said enabled input branches thereof and a conversion ratio at different scenarios, converting said transformed symbol into a serial data stream, and outputting said serial data stream; and a digital to analog converter for receiving said serial data stream from said parallel to serial converter, converting said serial data stream into an analog stream for transmission, and outputting said analog stream.

16. The programmable OFDM-CDMA transmitter of claim 15, wherein as said transmitter is operated on said multi-code access mode, said effective user splitter multiplexes said data stream into a plurality of sub-streams with each sub-stream having a basic rate.

17. The programmable OFDM-CDMA transmitter of claim 15, wherein said effective user splitter, as said transmitter is operated on said VSL mode, just forward said data stream to said serial to parallel converter.

18. The programmable OFDM-CDMA transmitter of claim 15, wherein in said MC-CDMA of said VSL mode, the number of parallel output branches from said serial-to-parallel converter are set to be m×P; otherwise, the number of parallel outputting branch is P.

19. The programmable OFDM-CDMA transmitter of claim 15, wherein if said scenario is MC-CDMA, said enabled branch is F for said multi-code access and F/m for said VSL access; and if said scenario is MT-CDMA, the number of branch is 1 for both said multi-code assessing mode and said VSL code accessing mode.

20. The programmable OFDM-CDMA transmitter of claim 15, wherein for MC-DS-CDMA and MT-CDMA, a cyclical multiplying by corresponding spreading codes (time-domain spreading) on each branch is set; for MC-CDMA mode, signal on each branch is spread by multiplying one corresponding bit of spreading codes (frequency-domain spreading).

21. The programmable OFDM-CDMA transmitter of claim 15, wherein said digital to analog converter supports an input data rate higher than any possible sampling rate.

22. A programmable OFDM-CDMA receiver for receiving an input data sequence, which are OFDM-CDMA analog signals from an OFDM-CDMA transmitter through a plurality of communication channels; being operated in plurality of pre-selected modes containing a multi-code assessing mode and a VSL code and each mode serving a plurality of scenarios an MC-CDMA scenario, a MC-DS CDMA scenario, and a MT-CDMA scenario and having a plurality of predetermined despreading codes with a predetermined despreading factors corresponding to a plurality of spreading codes in said OFDM-CDMA transmitter, comprising:

an analog to digital converter for controlling a sample rate of said received OFDM-CDMA multiplexed signals including the number of input data utilized in following FFT operation in responsive to a selected scenario, converting input analog signals into a digital sequence and outputting said digital sequence;

a serial to parallel converter for receiving said digital sequence from said analog to digital converter and determining a ratio in serial to parallel conversion and the number of parallel outputs of said serial to parallel converter responsive to said selected scenario, converting said digital sequence outputted from said analog to digital converter into a plurality of parallel data and output said parallel data;

an FFT processor for receiving said parallel data from said serial to parallel converter; performing an FFT operation to said parallel data to form a plurality of transformed data and outputting said plurality of transformed data;

a sample filter for receiving said plurality of transformed data outputted from said FFT processor, deciding regular filtering for said multi-rate MC-CDMA and multi-rate MC-DS-CDMA or circular-shift-filtering for said multi-rate MT-CDMA will be executed, controlling filtering of said plurality of transformed data after FFT to discard signals out of predetermined sub-bands, and determining enabled tapped-delay-lines; wherein a pass window of sample filtering having a width equal to the number of sub-carriers is used in transmission;

a despreader for receiving outputs from said sample filter, dispreading each output of said sample filter in response to said selected scenario by multiplying a plurality of said despreading codes, and outputting a plurality of despreading data;

a sampler having an input from said despreader for determining a sampling rate for taking samples on each line at said dispreading process and outputting a plurality of sampled data; wherein said sampling rate equals said OFDM symbol duration;

a detector having an input of said plurality of sampled data from said sampler for making a decision by combining these diversities based on a collection of samples from said sampler and outputting a detected sequence; and a demultiplexer receiving said detected sequence from said detector for de-multiplexing the detected sequence in response to a selected multi-code mode so as to reconstruct an original data sequence from said OFDM-CDMA transmitter.

23. The programmable OFDM-CDMA receiver of claim 22, wherein said sample filter performs circular-shift-window filtering for MT-CDMA modes and regular sample filtering for MC-CDMA mode and MC-DS-CDMA mode.

24. The programmable OFDM-CDMA receiver of claim 22, wherein in said FFT processor and sample filter, FFT is operated with circular-shift-window filtering for MT-CDMA modes and with regular sample filtering for MC-CDMA and MC-DS-CDMA modes.

25. The programmable OFDM-CDMA receiver of claim 22, wherein said despreader has a tapped-delay-line (TDL) form and the number of enabled TDL equals a width of said pass window in said sample filter.

26. The programmable OFDM-CDMA receiver of claim 25, wherein said despreader determines the number of enabled tap and a time spacing of each tap for MC-CDMA modes, only one tap is needed and each line corresponds to one bit of said spreading codes; for MC-DS-CDMA and MT-CDMA modes, the number of taps in each tapped-delay-line equals said spreading factor.

* * * * *